(12) United States Patent
Aoyama

(10) Patent No.: US 6,480,300 B1
(45) Date of Patent: Nov. 12, 2002

(54) IMAGE PROCESSING APPARATUS, IMAGE PROCESSING METHOD AND RECORDING MEDIUM ON WHICH SOFTWARE FOR EXECUTING THE IMAGE PROCESSING IS RECORDED

(75) Inventor: Tatsuya Aoyama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/288,505

(22) Filed: Apr. 8, 1999

(30) Foreign Application Priority Data

Apr. 8, 1998 (JP) .......................................... 10-096302

(51) Int. Cl.$^7$ ........................ G06K 15/02; H04N 1/409; H04N 1/58; G06T 5/00

(52) U.S. Cl. ..................... 358/1.9; 358/3.26; 358/3.27; 358/532; 382/264; 382/274

(58) Field of Search ........................ 358/1.9, 532, 3.26, 358/3.27; 382/264, 260, 255, 274, 273, 266, 254

(56) References Cited

U.S. PATENT DOCUMENTS 6,148,113 A * 11/2000 Wolverton et al. .......... 382/254

* cited by examiner

Primary Examiner—Scott Rogers
(74) Attorney, Agent, or Firm—Birch, Stewart, Kolasch & Birch, LLP

(57) ABSTRACT

The image processing apparatus comprises: section for converting the original image signals into conversion image signals which represent an amount corresponding to luminance of a subject, intensity of incident light, or reproducing luminance; section for creating soft-focus processing conversion image signals by subjecting the conversion image signals to preset smoothing processing; and section for inversely converting the soft-focus processing conversion image signals into the digital soft-focusing image signals. The image processing apparatus, the image processing method and the recording media on which software for executing the image processing is recorded that are capable of obtaining a soft-focused image having an effect near to flare, which is obtained in the soft-focusing executed in an analog mode when an image is actually recorded with a camera and capable of obtaining a processed image having an optimum frequency processing effect such as a sharpness-enhanced image, in which the sharpness of the image is enhanced while restricting the deterioration of the graininess of a human skin.

24 Claims, 14 Drawing Sheets

IMAGE PROCESSING APPARATUS, IMAGE PROCESSING METHOD AND RECORDING MEDIUM ON WHICH SOFTWARE FOR EXECUTING THE IMAGE PROCESSING IS RECORDED

BACKGROUND OF THE INVENTION

The present invention relates to an image processing apparatus, an image processing method and a recording media on which software for executing the image processing is recorded. More specifically, the present invention pertains to an image processing apparatus, an image processing method and a recording media on which software for executing the image processing is recorded that are capable of creating a frequency-processed image such as a soft-focused image, a sharpness-enhanced image, and the like, when the image processing apparatus is used in a color image reproducing system, which reproduces a color image as a visible image in the following manner. That is, a subject or an image is photoelectrically read, and original image signals, which are obtained by converting the image into digital signals and represent an amount proportional to an optical density or to a logarithmic exposure amount are subjected to image processing.

There have been proposed color image reproducing systems. With the color image reproducing systems, a color image recorded on a negative film, a reversal film, a color print, and the like is photoelectrically read with a photoelectric conversion device such a charge coupled device (CCD) or the like; the color image is converted into digital signals and stored in an image signal storing unit such as a frame memory or the like as original image signals; the color image stored in the image signal storing unit is subjected to image processing; subsequently, the thus processed image signal is reproduced on a recording material such as a color paper or the like, or on a cathode ray tube (CRT).

According to the color image reproducing system, even if a color image is recorded under improper recording conditions such as underexposure, overexposure, and the like and recorded on a negative film, a reversal film, a color print, or the like, the color image reproducing system can reproduce resulting original image signals as a color image having desired colors and gradation by subjecting the original image signals to image processing. In addition, the color image reproducing system can reproduce a color image recorded on a negative film, a reversal film, a color print, and the like as a color image having different colors and gradation, when desired.

In contrast, although a soft-focused image is created by multiple exposure when a photograph is taken or when a photograph is printed, the multiple exposure is a time-consuming technology. Thus, there has been strongly desired to create a soft-focused image, which has the same effect as that created by the multiple exposure, by means of the above color image reproducing system based on a color image recorded on a negative film, a reversal film, a color print, and the like without the execution of the multiple exposure.

To satisfy the desire, the applicant has disclosed an image processing apparatus which can create a soft-focused image by carrying out digital image processing in the above digital color image reproducing system in Japanese Unexamined Patent Publication No. 9-172600. The image processing apparatus, which is disclosed in the publication, is arranged such that a color image is read and subjected to logarithmic (LOG) conversion in the above color image reproducing system; thereafter, original image signals are obtained by subjecting image signals stored in a frame memory to color conversion; subsequently, the original image signals are subjected to unsharp mask processing to thereby obtain unsharp image signals; then, image signals for creating a soft-focused image is created by combining the unsharp image signals with the original image signals at a prescribed rate.

Incidentally, when a photographic image is handled as digital data, it is an ordinary practice that image signals, which have been input or read, that is, image data showing an amount corresponding to or in proportional to subject luminance or intensity of light incident to the subject such as data corresponding to subject illuminance or exposure amount (hereinafter called as exposure amount data) are processed so that they are converted into data representing an amount, which is relatively linear to human eyes and is proportional to an optical density or to a logarithmic exposure amount (hereinafter, referred to as "density data"); then, various kinds of image processing steps are carried out to the converted data.

In the image processing apparatus disclosed in Japanese Unexamined Patent Publication No. 9-172600, original image signals (exposure amount data), which have been obtained by reading a color image, are subjected to logarithmic (LOG) conversion and converted into density data; thereafter, unsharp image signals are created; and the unsharp image signals are added to the original image signals at an arbitrary rate. As a result, the image processing apparatus can also create an image having an soft-focusing effect.

It is true that when soft focus processing is carried out using the image signal data converted into the density data as carried out by the above technology, a processed image is finished to have soft feeling. However, the technology has a problem that it cannot produce the loss of definition of light from a bright portion to a dark portion, that is, so-called flare feeling, which can be produced when an image is recorded with an actual camera in a soft-focus mode.

Further, with the technology, the adding rates of the original image and the unsharp image, which are added to each other as density data, are unchanged at any portion of one image. Accordingly, there is also a problem that when the adding rate of the unsharp image is increased to provide an image with soft feeling, the core of the image is made excessively unsharp and the edge of the image, to which human eyes are most sensitive, tends to be felt only unsharp. Whereas, there is an additional problem that when a soft effect is restricted and the adding rate of the original image is increased to emphasize the core of the image, the badness of graininess is made noticeable.

On the other hand, there is a further problem that when sharpness emphasizing processing is carried out using the density data at the time a color image is reproduced on a finished print from a color negative film and a color reversal film, a processed image is made sharp, but the graininess of a human skin is made bad.

SUMMARY OF THE INVENTION

An object of the present invention is to solve the problems of prior art and to provide an image processing apparatus, an image processing method and a recording media on which software for executing the image processing is recorded that are capable of obtaining a soft-focused image having an effect near to flare, which is obtained in the soft-focusing executed in an analog mode when an image is actually recorded with a camera and capable of obtaining a processed image having an optimum frequency processing effect such as a sharpness-enhanced image, in which the sharpness of the image is enhanced while restricting the deterioration of the graininess of a human skin. The image processing apparatus and method are arranged such that when frequency-processed images such as the soft-focused image, the sharpness-enhanced image, and so forth, are to be created by subjecting digital original image signals, which have been obtained, to image processing, frequency processing such as soft-focus processing, sharpness enhancement processing and the like is carried out by changing the digital data of the original image signals, which is represented by a logarithmic scale, a power scale or the like, to image signal data which represents an amount corresponding to or proportional to the amount of the luminance of the subject or of the intensity of incident light, or corresponding to reproduced luminance, for example, the luminance of the subject or the intensity of the incident light before they are subjected to logarithm (LOG) conversion or power conversion, or the reproduced luminance processed to raise an inclination of its gradation by taking an influence of the flare or an improvement of a freshness or briliance in color or the like into consideration.

To achieve the above object, the inventors have diligently studied to create a soft-focused image having flare feeling which can be realized in the analog mode when an image is recorded by a camera. As a result, the inventors have achieved the present invention by finding that when soft focus processing is to be applied to digital image signal data, it is preferable to carry out image processing by changing data (for example, density data), which represents an amount proportional to an optical density or a logarithmic exposure amount, to exposure amount data. The reason is that when the analog mode, in which an actual soft-focused image is created by recording an image with a camera using a soft-focus lens or by recording an image or printing a picture by multiple exposure, is taken into consideration, it is conceived that image processing is applied to an image signal (for example, exposure amount data) which represents an amount proportional to the luminance of a subject having been input or to the intensity of incident light.

More specifically, the present invention provides an image processing apparatus for creating digital soft-focusing image signals, which create an soft-focused image, by subjecting digital original image signals to image processing. The image processing apparatus comprises a means for converting the original image signals into conversion image signals which represent an amount corresponding to the luminance of a subject, the intensity of incident light, or reproducing luminance; a means for creating soft-focus processing conversion image signals by subjecting the conversion image signals to prescribed smoothing processing; and a means for inversely converting the soft-focus processing conversion image signals into the digital soft-focusing image signals.

The present invention provides the image processing apparatus, wherein the means for creating the soft-focus processing conversion image signals comprises a means for creating unsharp image signals from the conversion image signals and an addition mean for adding the conversion image signals to the unsharp image signals at a prescribed adding rate to thereby create the soft-focus processing conversion image signals. More specifically, it is preferable that the smoothing processing creates. the unsharp image signals from the conversion original image signals and adds the conversion original image signals to the unsharp image signals at the prescribed adding rate.

It is preferable that the means for creating the soft-focus processing conversion image signals further comprises a gain adjustment means for adjusting at least one of the gains of the medium frequency component and the high frequency component of the conversion image signals, wherein the adding means adds the conversion image signals, whose gain has been adjusted by the gain adjustment means, to the unsharp image signals to thereby create the soft-focus processing conversion image signals.

Further, it is preferable that the means for creating the soft-focus processing conversion image signals further comprises an adding rate adjustment means for adjusting the adding rate at which the gain-adjusted conversion image signals are added to the unsharp image signals.

It is preferable that the means for creating the soft-focus processing conversion image signals further comprises an adding rate adjustment means for adjusting the adding rate at which the conversion image signals are added to the unsharp image signals.

Further, it is preferable that the means for creating the soft-focus processing conversion image signals further comprises a determination means for determining the density in an image using the original image signals, wherein the adding rate adjustment means adjusts the adding rate in accordance with the density in the image determined by the determination means.

It is preferable that the means for creating the unsharp image signals is an unsharp mask processing means including a lowpass filter.

It is preferable that the means for creating the unsharp image signals comprises a means for converting the conversion image signals into a luminance signal and an unsharp mask processing means for subjecting the luminance image signals, which have been converted into the luminance signal, to unsharp mask processing.

It is preferable that the original image signals and the digital soft-focusing image signals are image signals which represent an amount propotional to an optical density or a logarithmic exposure amount.

The present invention provides an image processing apparatus for creating digital frequency processing image signals, which create a frequency-processed image, by subjecting digital original image signals to frequency processing. The image processing apparatus comprises a means for converting the original image signals into conversion image signals which represent an amount corresponding to the luminance of a subject, the intensity of incident light, or reproducing luminance; a frequency processing means for carrying out frequency processing using the conversion image signals; and a means for inversely converting the conversion image signals, which have been subjected to the frequency processing, into the digital frequency processing image signals.

In the above arrangement, it is preferable that the frequency processing is soft-focus processing or sharpness enhancement processing, and the frequency processing means is a soft-focus processing means or a sharpness enhancement processing means.

Moreover, the present invention provides an image processing method, comprising the steps of: converting digital original image signals into conversion image signals which represent an amount corresponding to subject luminance, incident light intensity, or reproducing luminance;

creating soft-focus processing conversion image signals by subjecting the resultant conversion image signals to preset smoothing processing; and inversely converting the resultant soft-focus processing conversion image signals into digital soft-focusing image signals.

Preferably, the soft-focus processing conversion image signals are created by creating unsharp image signals from the conversion image signals and adding the conversion image signals to the unsharp image signals at preset adding rate.

Preferably, the soft-focus processing conversion image signals are created by adjusting at least one of the gains of the medium frequency component and the high frequency component of the conversion image signals and adding the gain-adjusted conversion image signals to the unsharp image signals.

Preferably, the preset adding rate, at which the gain-adjusted conversion image signals are added to the unsharp image signals, is adjusted.

Preferably, the preset adding rate, at which the conversion image signals are added to the unsharp image signals, is adjusted.

Preferably, the density in an image is determined using the original image signals, and the preset adding rate is adjusted in accordance with the determined density in the image.

Preferably, the unsharp image signals are created by unsharp mask processing executed using a lowpass filter.

Preferably, the unsharp image signals are created by converting the conversion image signals into a luminance signal and subjecting luminance image signals, which have been converted into the luminance signal, to unsharp mask processing.

Preferably, the original image signals and the digital soft-focusing image signals are image signals which represent an amount proportional to an optical density or a logarithmic exposure amount.

Moreover, the present invention provides an image processing method, comprising the steps of: converting digital original image signals into conversion image signals which represent an amount corresponding to subject luminance, incident light intensity, or reproducing luminance;
    carrying out frequency processing using the resultant conversion image signals; and
    inversely converting the resultant frequency-processed conversion image signals into digital frequency-processed image signals.

Preferably, the frequency processing is soft-focus processing or sharpness enhancement processing.

Moreover, the present invention provides a recording medium on which software for executing the image processing methods according to the above-described aspects of the present invention is recorded.

The image signals to be subjected to the soft-focus processing of the present invention may be the image data which has been captured by a camera when it records a subject (scene), that is, they may be the image data which has been obtained by an input device such as a scanner and the like when it reads an image recorded by an ordinary camera on a photographic film. Further, they may be the image data which has been recorded by a directly-recording camera type input device such as a digital camera, a digital video camera, and so forth and has been directly obtained thereby. Furthermore, they may be the image signals which have been subjected to picture-creation processing that is ordinarily carried out when image data captured by the various types of the cameras (input devices) is finished to a print, that is, they may be the image signals which have been subjected to gradation processing and the like which are carried out in consideration of the effect of flare when a subject is observed as well as the improvement of color vividness, and so forth.

In the present invention, the image signals, which have been output from an input device after they are subjected to logarithmic conversion or to power conversion or after they are converted into the digital luminance output value of target gradation, are referred to as image signals which represent a value proportional to an optical density or to a logarithmic exposure amount. The data representing the image signals is referred to as density data. Therefore, the digital original image signals which are input to the image processing apparatus of the present invention, the digital soft-focusing image signals which are obtained in the apparatus, and the digital output image signals which are output from the apparatus are image signals that represent the amount proportional to the optical density or to the logarithmic exposure amount.

In contrast, the image signals, which are directly detected by the input device before they are subjected to the logarithmic conversion or to the power conversion or before they are converted into the digital luminance output value of the target gradation, for example, the image signals, which correspond to subject illumination intensity, subject reflectance, and an exposure amount, are referred to as image signals, which represent an amount corresponding to or proportional to the subject luminance or the incident light intensity. The data representing the image signals are referred to as exposure amount data. In addition, the image signals, which are obtained by subjecting the image density data supplied from the input device to the above picture creation processing and then converting the resultant processed data to signals before they are subjected to the logarithmic conversion or to the power conversion or before they are converted into the digital luminance output value of the target gradation are referred to as image signals which represent an amount corresponding to or proportional to reproduction luminance. The image signals are processed similarly to the image signals which represent the amount corresponding to or proportional to the subject luminance or the incident light intensity. Thus, the data representing the image signals is referred to as the exposure amount data.

DETAILED DESCRIPTION OF THE INVENTION

The image processing apparatus, the image processing method and the recording media on which software is recorded according to the present invention will be described below in detail with reference to the preferred embodiment shown in the accompanying drawings.

Figure 1:
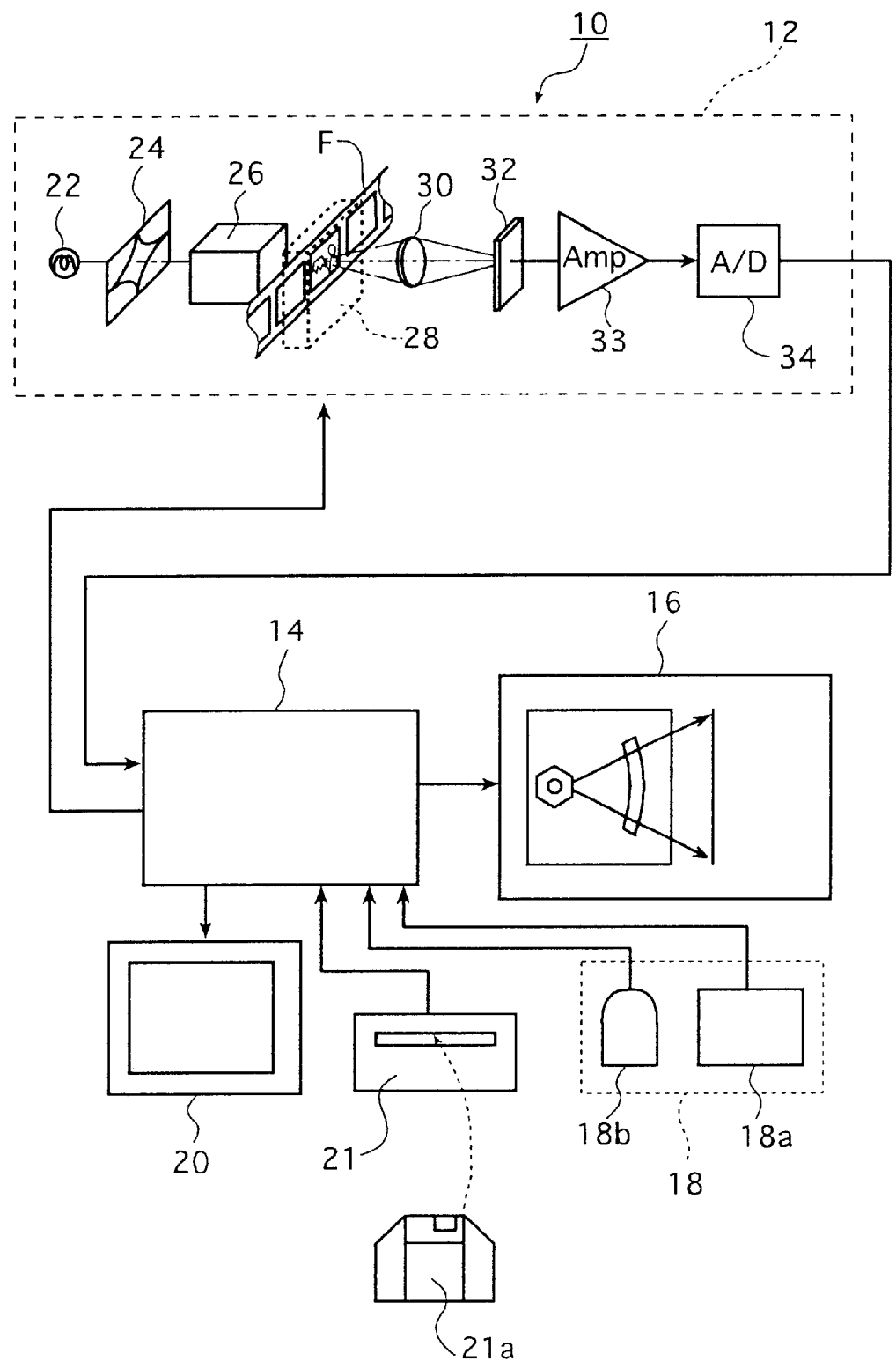
FIG. 1 is a block diagram of an embodiment of a digital photo printer to which an embodiment of an image processing apparatus of the present invention is applied.

FIG. 1 is a block diagram of an embodiment of a digital photoprinter to which the image processing apparatus of the present invention that performs the image processing method of the invention is applied. In the following description, the image processing apparatus carries out soft-focus processing as typical frequency processing of the invention. However, the present invention is not limited thereto and the image processing apparatus may carry out sharpness enhancement processing as the frequency processing of the present invention. Moreover, in the following, an representative example in which the image processing apparatus of the invention that have been constructed as hardware is primarily described. However, the invention is not limited thereto and the image processing apparatus of the invention may of course be constructed as software, such as, performing the image processing method of the invention.

The digital photoprinter shown in FIG. 1 (which is hereunder simply referred to as "photoprinter") 10 comprises a scanner (image reading apparatus) 12 for photoelectrically reading the image recorded on a film F, an image processing apparatus 14, which performs image processing such as soft-focus processing and the like on the image data (image information) read by the scanner 12 and with which the photoprinter 10 as a whole is manipulated and controlled, and an image recording apparatus 16, which performs imagewise exposure of a light-sensitive material (photographic paper) with light beams modulated in accordance with the image data delivered from the image processing apparatus 14 and which performs development and other necessary processing to output a soft-focused image as a (finished) print.

Connected to the image processing apparatus 14 are a manipulating unit 18 having a keyboard 18a and a mouse 18b for inputting and setting various conditions, selecting and commanding a specific processing step and entering a command and so forth for effecting color/density correction and the like, as well as a monitor 20 for representing the image captured with the scanner 12, various manipulative commands and pictures for setting and registering various conditions.

When the image processing apparatus of the invention that performs the image processing method of the invention is constructed as software, a drive source 21 for driving recording media of the invention that have recorded software to perform this soft-focus processing of the invention may be connected to the image processing apparatus 14 so as to download this software in the image processing apparatus 14 such as at its CPU.

The scanner 12 is an apparatus with which the images recorded on the film F or the like are read photoelectrically frame by frame. It comprises a light source 22, a variable diaphragm 24, a diffuser box 26 which diffuses the reading light incident on the film F so that it becomes uniform across the plane of the film F, carriers 28 for the film F, an imaging lens unit 30, an image sensor 32 having 3-line CCD sensors capable of reading the image densities of R (red), G (green) and B (blue) images, an amplifier 33 and an analog to digital (A/D) converter 34.

In the photoprinter 10, the dedicated carriers 28 are available that can be loaded into the housing of the scanner 12 in accordance with the type of the film F used (e.g. whether it is a film of the advanced photographic system or a negative or reversal film of 135 size), the format of the film (e.g., whether it is a strip or a slide) or other factors. By replacing one carrier 28 with another, the photoprinter 10 can be adapted to process various kinds of films in various modes. The images (frames) that are recorded on the film and which are subjected to the necessary procedure for print production are transported to and held in a prescribed reading position by means of the carriers 28.

As known well, a magnetic recording medium is formed on the film used in an advanced photographic system, and a cartridge ID, a type of the film, and so forth are recorded to the magnetic recording medium. Further, various kinds of data such as a recording date when images are recorded on the film, a developing date when the film is developed, types of a camera and a developing device, and the like can be recorded to the magnetic recording medium. A means for reading the magnetic information is provided with a carrier 28 corresponding to the film (cartridge) of the new photo system. The magnetic information reading means reads the magnetic information when the film is transported to a reading position, and the various kinds of the information is supplied to the image processing apparatus 14.

The scanner 12 captures the images recorded on the film F in the following manner; the uniform reading light from the light source 22 has its amount adjusted by means of the variable diaphragm 24 and the diffuser box 26 is incident on the film F held in the prescribed reading position by means of the carrier 28 and thereafter passes through the film F to produce projected light bearing the image recorded on it.

Figure 2A:
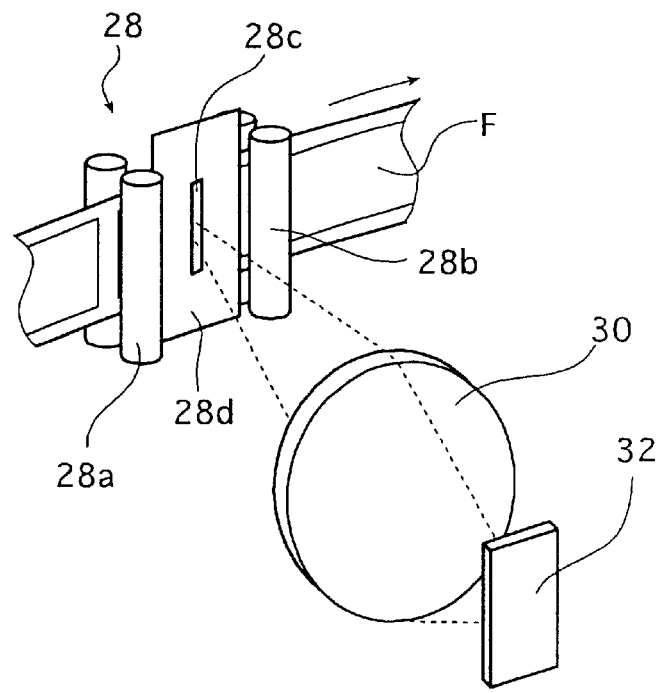
FIG. 2A is a schematic perspective view for illustrating an embodiment of a carrier to be installed in the digital photoprinter shown in FIG. 1.

The illustrated carrier 28 transports elongated films F (strips) such as a 24-exposure film of 135 size, the cartridge for the advanced photographic system, and the like. As shown schematically in FIG. 2A, the carrier 28 has transport roller pairs 28a and 28b and a mask 28d having a slit 28c. The transport rollers 28a and 28b are disposed on opposite sides of the prescribed reading position in an auxiliary scanning direction which is perpendicular to the main scanning direction (i.e., the direction in which, for example, the R, G and B 3-line CCD sensors in the image sensor 32 extend) and they transport the film F with its length being parallel to the auxiliary scanning direction as it is in registry with the reading position. The slit 28c defines the projected light from the film F to have a prescribed narrow shape, is in registry with the reading position and extends in the main scanning direction.

Being held in registry with the reading position, the film F is transported in the auxiliary scanning direction by means of the carrier 28 as it is illuminated with the reading light. Consequently, the film F is subjected to two-dimensional slit scan with the reading light passing through the slit 28c extending in the main scanning direction, whereupon the image of each frame recorded on the film F is captured.

The light projected from the film F is focused by the imaging lens unit 30 to form an image on the light-receiving plane of the image sensor 32.

Figure 2B:
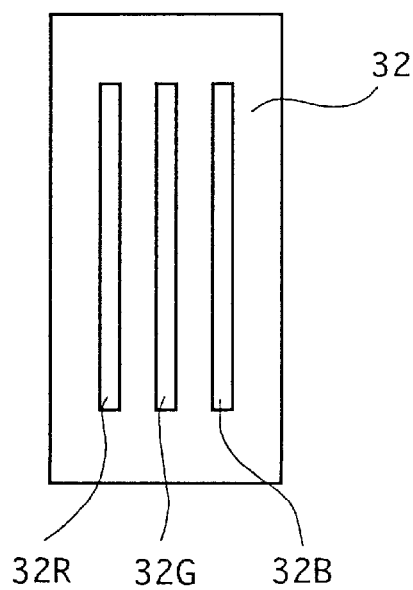
FIG. 2B is a conceptual view of an embodiment of an image sensor in the digital photoprinter shown in FIG. 1.

As shown in FIG. 2B, the image sensor 32 is a 3-line color CCD sensor comprising a line CCD sensor 32R for reading R image, a line CCD sensor 32G for reading G image, and a line CCD sensor 32B for reading B image. As mentioned above, the respective line CCD sensors extend in the main scanning direction. The projected light from the film F is separated into three primary colors R, G and B and captured photoelectrically by means of the image sensor 32.

The output signals of R, G and B from the image sensor 32 are amplified with the amplifier 33 and supplied to the A/D converter 34. In the A/D converter 34, the output signals are converted into R, G and B digital image data of, for example, 12 bits and then supplied to the image processing apparatus 14. These digital image data of R, G and B can be construed as image signals (image density data) indicating the amount corresponding to or proportional to the luminance of the subject or the intensity of incident light.

In the scanner 12, the images recorded on the film F are captured by two scans, the first being prescan at a low resolution (the first capture of the images) and the second being fine scan for obtaining output image data for output images (the second capture of the images).

Prescan is carried out under preset reading conditions that ensure that all the images of the film F to be handled by the scanner 12 can be read without saturating the image sensor 32.

In contrast, fine scan uses the prescanned data and is performed under reading conditions that are set for each frame such that the image sensor 32 is saturated at a slightly lower density than the minimum density of the image (frame) of interest. The output image signals for prescan and fine scan are essentially the same data except for resolution and output image signal level.

It should be noted that the scanner to be used in the photoprinter 10 is by no means limited to a type that relies upon the slit scan capturing described above but that it may be of a type that relies upon areal capturing, or a technique by which the entire surface of the film image in one frame is captured at a time.

In this alternative approach, an area sensor, for example, as an area CCD sensor, or the like may be used with a means for inserting R, G and B color filters interposed between the light source 22 and the film F. The images of the film F are separated into three primary colors and captured in the following manner; the R, G and B color filters are sequentially inserted to the light passage of the light emitted from the light source, the reading light, which has passed through each of the color filters, is irradiated onto the entire surface of the film F, and the entire images of the film are captured by focusing the light having passed through the filters on the area CCD sensor.

As mentioned above, the digital image data signals output from the scanner 12 are fed to the image processing apparatus 14, which is the feature of the present invention.

Figure 3:
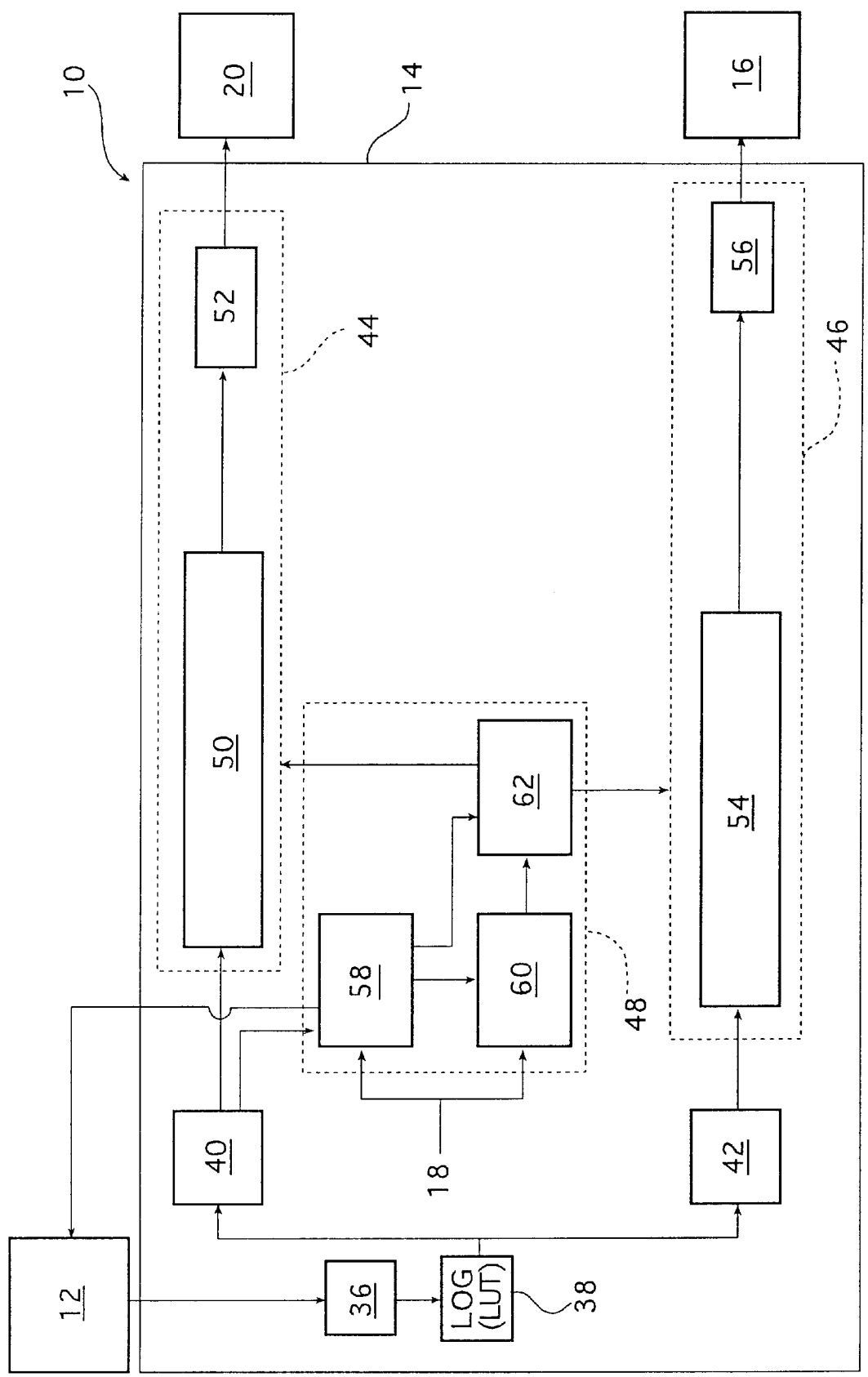
FIG. 3 is a block diagram of an embodiment of an image processing apparatus in the digital photoprinter shown in FIG. 1.

FIG. 3 is a block diagram of the image processing apparatus 14 of the present invention (which is hereunder simply referred to as "processing apparatus").

The image processing apparatus 14 comprises a scanner correcting section 36, a LOG converter 38, a prescan (frame) memory 40, a fine scan (frame) memory 42, a prescanned data processing section 44, a fine-scanned data processing section 46 for creating a soft-focused image which is the feature of the present invention, and a condition setting section 48.

FIG. 3 mainly shows the parts relating to image processing, and besides these parts, the image processing apparatus 14 includes a CPU for controlling and managing the overall operation of the photoprinter 10 including the image processing apparatus 14, memories for storing the information necessary for the operation and otherwise of the photoprinter 10. The manipulating unit 18 and the monitor 20 are connected to related parts via the CPU and the like (CPU bus).

The R, G and B image signals, for example, the digital image data of 12 bits, which has been input from the scanner 12 to the image processing apparatus 14, is supplied to the scanner correcting section 36.

The scanner correcting section 36 carries out the data correction of the captured image data such as DC offset correction, darkness correction, defective pixel correction, shading correction, and the like in order to correct the dispersion of the sensitivity of each of the pixels, the dark current and the like of the R, G and B digital image data, which are caused by the 3-line CCD sensors 32R, 32G and 32B of the image sensor 32 in the scanner 12. The digital image signals, which have been subjected to the processing for correcting the dispersion of the sensitivity of each of the pixels and the dark current, is supplied to the LOG converter 38.

The LOG converter 38 converts the digital image data into digital image density data through logarithm conversion processing, and then converts the digital image density data into target digital image density data through gradation conversion processing. For example, the digital image data of, for example, 12 bits, which has been corrected by the scanner correcting section 36, is converted into digital image density data of 10 bits (0–1023) by means of, for example, a look-up table (LUT).

The digital image density data, which has been converted by the LOG converter 38, is stored (contained) in the prescan (frame) memory 40, if it is prescanned data, whereas the data is stored (contained) in the fine scan (frame) memory 42, if it is fine-scanned data, respectively.

The prescan memory 40 is a frame memory for storing or containing the low resolution image density data of each of R, G and B colors in one entire frame of the film F. The low resolution image density data is obtained by prescanning the film F with the scanner 12 and subjecting the data obtained by the prescan to various kinds of processing for data correction and the logarithmic conversion processing. The prescan memory 40 must have a capacity capable of storing the image density data of R, G and B three colors of the image recorded on at least one frame of the film F. However, the prescan memory 40 may have a capacity capable of storing the image density data for a plurality of frames, or may be composed of a multiplicity of memories each having capacity for one frame.

The prescanned image data stored in the prescan memory 40 is read into the prescanned data processing section 44.

In contrast, the fine scan memory 42 is a frame memory for storing or containing the high resolution image density data of each of R, G and B colors in one entire frame of the film F. The high resolution image density data is obtained by fine-scanning the film F with the scanner 12 and subjecting the data resulting from the fine scanning to various kinds of processing for data correction and the logarithmic conversion processing. It is preferable that the fine scan memory 42 has a capacity capable of storing the image density data of R, G and B three colors of the images recorded on at least two frames of the film F, reads out the image density data of one frame while the image density data of another frame is written to the fine scan memory 42, and permits the fine-scanned data processing section 46 to carry out various kinds of processing at the same time to create a soft-focused image, which is the feature of the present invention. However, the present invention is by no means limited thereto and may have a capacity which can store the image density data of one frame and process frames one by one. Further, the fine scan memory 42 may be composed of a multiplicity of memories each having a capacity for one frame and used as, for example, a toggle memory.

The fine-scanned image data stored in the fine scan memory 42 is read into the fine-scanned data processing section 46.

The prescanned data processing section 44 for subjecting the prescanned image data stored in the prescan memory 40 to various kinds of image processing, which is necessary to display the prescanned image data on the monitor 20, includes an image processing subsection 50 and an image data conversion subsection 52.

In the image processing subsection 50, the prescanned image data is subjected to prescribed image processing such as gradation correction, color conversion, density conversion, and the like through the calculations executed by a look-up table (which is hereunder simply referred to as "LUT") and a matrix (which is hereunder simply referred to as "MTX"). The prescanned image data has been captured by the scanner 12 under the image processing conditions set by the condition setting section 48, which will be described later, and stored in the prescan memory 40. As a result, the prescanned image data can be reproduced as a color image on the CRT display screen of the monitor 20 to be described later with desired quality.

The image data conversion subsection 52 optionally thins out the image data, which has been processed by the image processing subsection 50, so that it fits the resolution of the monitor 20, and similarly converts the thinned-out image data into the image data, by means of a three-dimensional (3-D) LUT or the like, which corresponds to the representation on the monitor 20 to permit the thus obtained image data to be displayed thereon.

The processing conditions for the various image processing steps to be done in the image processing subsection 50 are set by the condition setting section 48 which will be described later.

The fine-scanned data processing section 46 includes an image processing subsection 54 and an image data conversion subsection 56 in order to subject the fine-scanned image data stored in the fine scan memory 42 to various kinds of image processing necessary to output the fine-scanned image data from the image recording apparatus 16 as a color print and in order to carry out the soft-focused image creation processing of the present invention.

The image processing subsection 54 subjects the image data, which has been captured by the scanner 12 under the image processing conditions set by the condition setting section 48 to be described later and stored in the fine scan memory 42, to various kinds of image processing. The various kinds of the image processing includes color balance adjustment, gradation adjustment, color adjustment, density adjustment, saturation adjustment, electronic magnification, frequency processing such as sharpness enhancement (edge enhancement for sharpening the edge), dodging (compressing/extending the density's dynamic range), creation of a soft-focused image, gain adjustment by executed by frequency bands, determination of an image density, and the like by means of a LUT, a MTX operation unit, a lowpass filter, an adder/subtracter, and the like. As a result, the image data can be reproduced on a color paper as a color image or a color soft-focused image, which is the object of the present invention, each having a desired density, gradation and tone. The details of the above image processing steps will be described later.

The image data conversion subsection 56 converts the image data, which has been subjected to the frequency processing by the image processing subsection 54, that is, the soft-focusing image data in this case, to image data corresponding to image recording on the image recording apparatus 16 by means of, for example, the 3-D LUT and the like. Then, the image data conversion subsection 56 supplies the converted image data to the image recording apparatus 16.

The image recording apparatus 16 is an apparatus for outputting a finished color print, on which a frequency-processed color image has been reproduced, that is, a color soft-focused image has been reproduced in this case, based on the image data supplied from the fine-scanned data processing section 46.

The processing conditions in the image processing subsection 54 are set by the condition setting section 48 to be described later.

Next, the condition setting section 48 sets the reading conditions for the fine scan as well as various kinds of processing conditions for the prescanned data processing section 44 and the fine-scanned data processing section 46.

The condition setting section 48 includes a set-up subsection 58, a key correcting subsection 60 and a parameter coordinating subsection 62.

The set-up subsection 58 sets the reading conditions for the fine scan using the prescanned image data and the like and supplies them to the scanner 12. In addition, the set-up subsection 58 creates (calculates) the image processing conditions for the prescanned data processing section 44 and the fine-scanned data processing section 46, and supplies them to the parameter coordinating subsection 62.

More specifically, the set-up subsection 58 captures the prescanned image data from the prescan memory 40, and creates a density histogram and calculates the image characteristic amounts of an average density, a large area transmitting density (LATD), highlight (minimum density), shadow (maximum density), and the like from the prescanned image data.

The set-up subsection 58 sets the reading conditions for the fine scan, for example, the light amount of the light source 22, the aperture value of the variable diaphragm 24, the storage time of the image sensor 32 (the respective line CCD sensors 32R, 32G, and 32B), and the like from the calculated image characteristic amounts so that the image sensor 32 (the line CCD sensors 32R, 32G, and 32B) is saturated in a density which is somewhat lower than the minimum density of a particular image. It must be noted that the reading conditions for the fine scan may be changed from the reading conditions for the prescan as to all the factors corresponding to the output level of the image sensor, as to only any one factor of the aperture value and the like, or as to only a plurality of factors such as the aperture value, the storage time and the like.

Further, the set-up subsection 58 sets the image processing conditions which were described above including the color balance adjustment, gradation adjustment and other adjustments, such as processing conditions to be used in picture forming such as raising the inclination of density (gradation hardening) by taking the influence of the flare or the improvement of the freshness or briliance in the colors or the like into consideration at prints that is performed when the fine scanned image data is outputted from the image recording apparatus 16 finally as a print, in accordance with the density histogram and the image characteristic amounts, and according to the operator's command and the like which are issued when necessary.

The key correcting subsection 60 calculates the adjustment amounts for adjusting the image processing conditions (for example, the correcting amount of the LUT, and the like) in accordance with the density (luminance), color, contrast, sharpness, and saturation which has been set by the keys (not shown) which are provided with the keyboard 18a and the manipulating unit 18, according to the adjustment amounts for adjusting the gains of medium and high frequencies, the adding rate at which an original image is added to an unsharp image, and the like for creating the soft-focused image of the present invention, and depending upon various kinds of commands which have been input through the mouse 18b. Then, the key correcting subsection 60 set parameters and supplies them to the parameter coordinating subsection 62.

The parameter coordinating subsection 62 receives the image processing conditions, which have been set by the set-up subsection 58, and sets the image processing conditions supplied thereto to the image processing subsection 50 in the prescanned data processing section 44 and to the image processing subsection 54 in the fine-scanned data processing section 46. Further, the parameter coordinating subsection 62 corrects (adjusts) the image processing conditions set to the respective subsections in accordance with the adjustment amounts calculated by the key correcting subsection 60. Otherwise, the parameter coordinating subsection 62 sets the image processing conditions again.

Subsequently, the image processing subsection 54 in the fine-scanned data processing section 46 for creating the soft-focused image, which is the feature of the present invention, will be described in detail.

Figure 4:
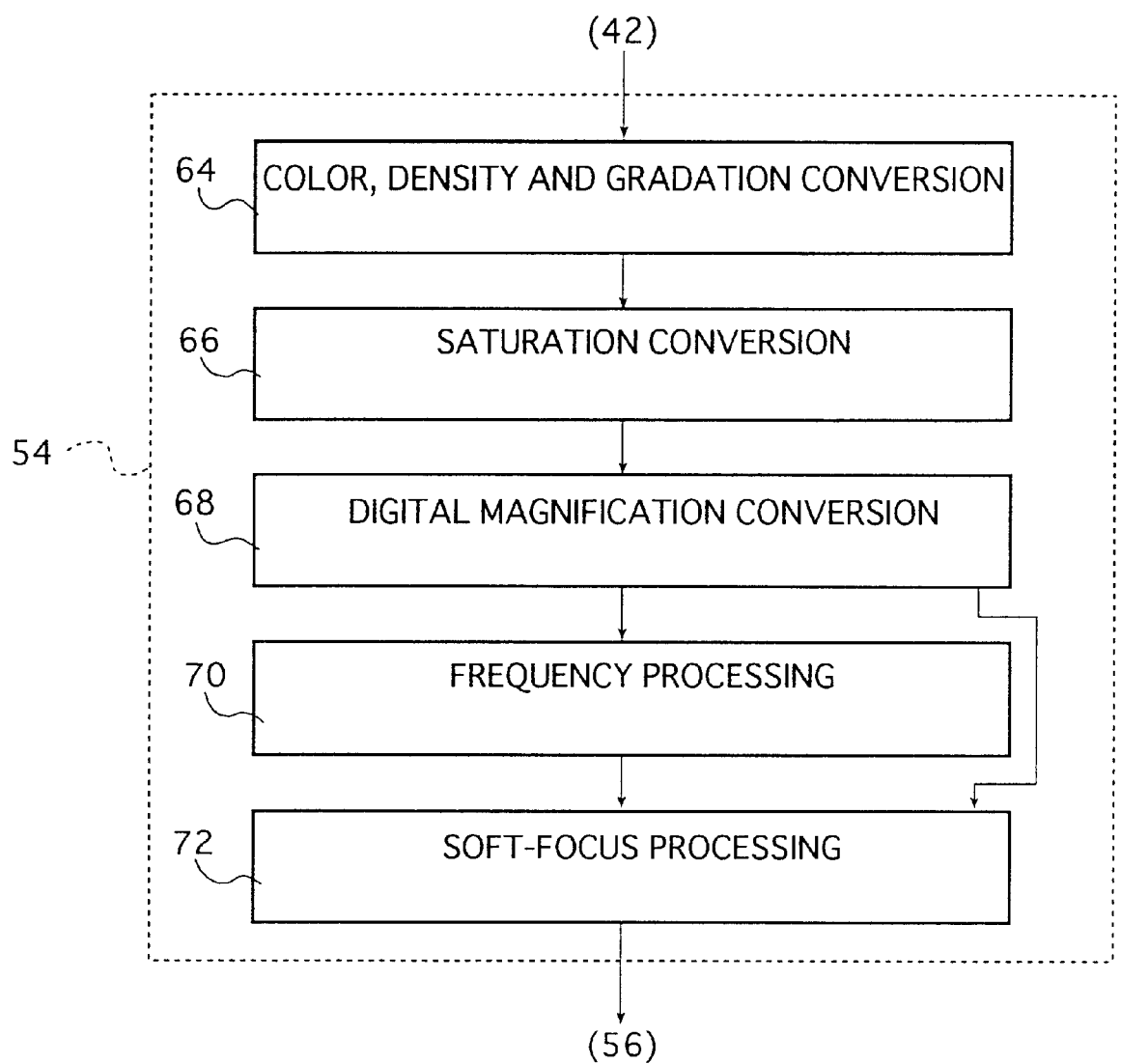
FIG. 4 is a block diagram of an embodiment of an image processing subsection of a fine-scanned data processing section in the image processing apparatus shown in FIG. 3.

FIG. 4 is a block diagram showing an embodiment of the image processing subsection 54 in detail. As shown in FIG. 4, the image processing subsection 54 includes a color, density and gradation conversion means 64 for converting the density, color and gradation of image data, a saturation conversion means 66 for converting the saturation of the image data, a digital magnification conversion (electronic magnification) means 68 for converting the number of pixels of the image data, a frequency processing means 70 for subjecting the image data to the frequency processing, and a soft-focus processing means 72 for converting the density dynamic range of the image data or applying soft-focusing to an image.

In the image processing subsection 54, the color, density and gradation conversion means 64 converts the image data into density data, color data and gradation data in accordance with the LUT and the like. The saturation conversion means 66 converts the saturation data of the image data, which has been obtained by the color, density and gradation conversion means 64, according to the MTX operation and the like. The electronic magnification means 68 interpolates or thins out the image data, which has been subjected to the saturation conversion by the saturation conversion means 66, in accordance with the size of a color image to be output from the image recording apparatus 16 to a color paper and in conformity with an output pixel density. The number of the pixels of the image data is thereby increased or decreased. The frequency processing means 70 applies the frequency processing such as edge enhancement and the like to the image data, which has been electronically magnified by the electronic magnification means 68 so as to have a prescribed output size and a prescribed output pixel density. The image data, which has been subjected to the frequency processing, is supplied to the soft-focus processing means 72. In the present invention, the image processing subsection 54 may be arranged such that the electronically-magnified image data output from the electronic magnification means 68 is directly supplied to the soft-focus processing means 72 bypassing the frequency processing means 70.

In general, a soft-focused image is created with a camera by recording a subject through multiple exposure, that is, by recording the subject under an ordinary exposure condition and recording it again in such a manner as to obtain an unsharp image.

With the present invention, a soft-focused image is basically created in such a manner that image signals corresponding to an unsharp image is created from original image signals using the soft-focus processing means, to which the dodging processing means disclosed in Japanese Unexamined Patent Publication No. 9-172600 is applied; then the unsharp image signals are combined with the original image signals.

Figure 5:
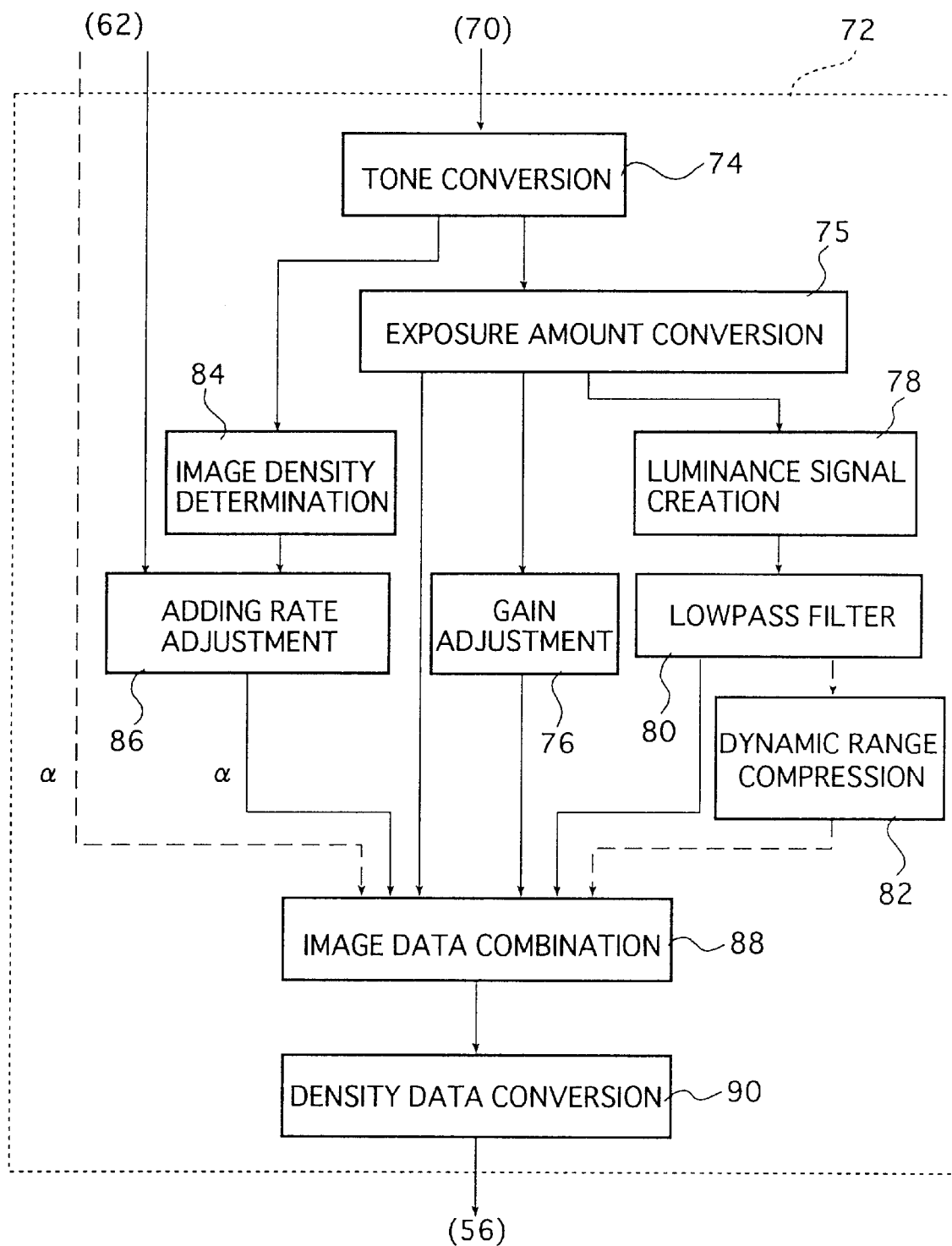
FIG. 5 is a block diagram of an embodiment of a soft-focus processing means of the image processing subsection shown in FIG. 4.

FIG. 5 is a block diagram showing an embodiment of the soft-focus processing means 72 in detail. This soft-focus processing means 72 is a part of characteristic features of the invention and performs the image processing method of the invention.

As shown in FIG. 5, the soft-focus processing means 72 is arranged to process image data; so that a color image can be reproduced without the occurrence of the dropouts in the low density (highlight) portion of an original image and without the occurrence of the blocked-outs in the high density (shadow) portion thereof; or so that a color image can be reproduced as an ideal soft-focused image having flare feeling, which can be obtained by processing in an analog mode, without the occurrence of unsharpness of the core of the image in such a portion of the color image as an edge where it is desired to leave the core of the image and without occurrence of uneven feeling due to graininess in such a portion of the color image as a skin, a highlight portion, and the like where it is desired to produce soft feeling. The former color image is reproduced in such a manner that the soft-focus processing means 72 converts image density data into exposure amount data before logarithmic conversion, power conversion or conversion to output amount of digital luminance has been performed (the data can be called as antilogarithmic image data, for example, in case of data before logarithmic conversion is performed), that is, converts the density signals of image data into converted image signals showing the amount corresponding to or proportional to the luminance of the subject, the intensity of incident light or reproducing luminance; thereafter, compresses the dynamic range of the density signal level of the image data, in particular, the wide density dynamic range of the original image such as a film image, and the like so that the dynamic range fits with the narrower dynamic range of the density signals of an output medium such as a color paper, and the like. In contrast, the latter color image is reproduced in such a manner that the soft-focus processing means 72 subjects image exposure amount data by which the invention is characterized (antilogarithm image data) to a proper soft-focus processing such as prescribed smoothing processing and the like. The soft-focus processing means 72 includes a tone conversion means 74, an antilogarithm conversion means 75, a gain adjustment means 76, a luminance signal conversion means 78, a lowpass filter 80, a density dynamic range compression means 82, an image density determination means 84, an adding rate adjustment means 86, an image signal combining means 88 and a density data conversion means 90.

In the soft-focus processing means 72, the tone conversion means 74 is a site where the tone signal level of the image data, to which the frequency processing has been applied by the frequency processing means 70, is converted and the image data is arranged as original image signals.

The exposure amount conversion means 75, which is one of the sections constituting the feature of the present invention, is a site where exposure amount (for example, antilogarithm conversion, that is, exponent conversion) conversion processing is carried out to convert the original image signals, which have been subjected to the tone conversion by the tone conversion means 74, into exposure amount image signals, that is, to convert digital image density data into exposure amount data.

Since the image density data, which has been photoelectrically captured from the film image with the scanner 12, is used in the photoprinter 10 shown in FIG. 1, the image data which is to be processed with the image processing apparatus 14 is image data (density data) of a logarithmic scale which is ordinarily represented by the following formula.

$$D = c_1 + c_2 \log E$$

where, D shows density data, E shows exposure amount data (antilogarithm amount data), and $c_1$ and $c_2$ are constants.

However, when the digital image data is obtained by photoelectrically capturing the film image with the scanner 12, the digital image data is input through the film F. Accordingly, an exposure amount (antilogarithm amount), which can be obtained when an image is actually recorded on the film F with a camera, cannot be obtained from the image signals input through the film. To cope with this problem, the exposure amount conversion means 75 calculates the exposure amount (antilogarithm amount) by the following method including exponent conversion.

In the following, description is made on image density data captured photoelectrically from an image recorded on a film so that, since the image density data show logarithmic exposure amount and the exposure amount shows antilogarithm amount, the exposure amount meaning converted image signals that indicate an amount corresponding to the luminance of the subject, the intensity of incident light or reproducing luminance is representatively exemplified by the antilogarithm amount. However, the invention is of course not limited to this.

Figure 6:
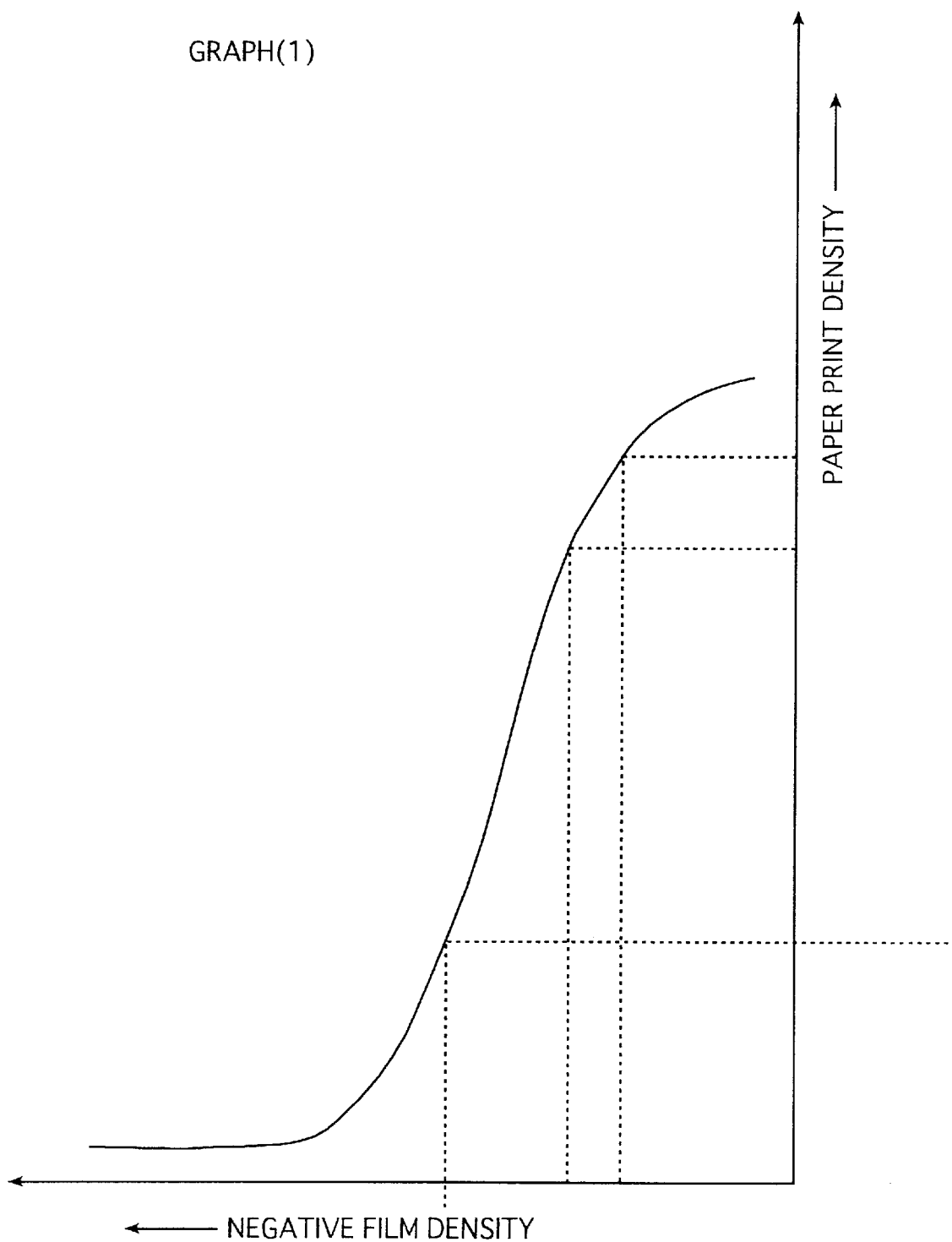
FIG. 6 is a graph showing an example of the relationship between the density of a color negative film and the print density of a color paper, which is used in an antilogarithm conversion means of the soft-focus processing means shown in FIG. 5.

First, as to the print paper which is used by the image recording apparatus 16 to reproduce a soft-focused image, there are determined the density characteristics between the print density of the print paper and the film density of the film F, which is to be captured with the scanner 12. For example, there are density characteristics as shown in the graph of FIG. 6 (hereinafter, referred to as "graph (1)") between the print density of the print paper and the negative film density of the negative film F.

Figure 7:
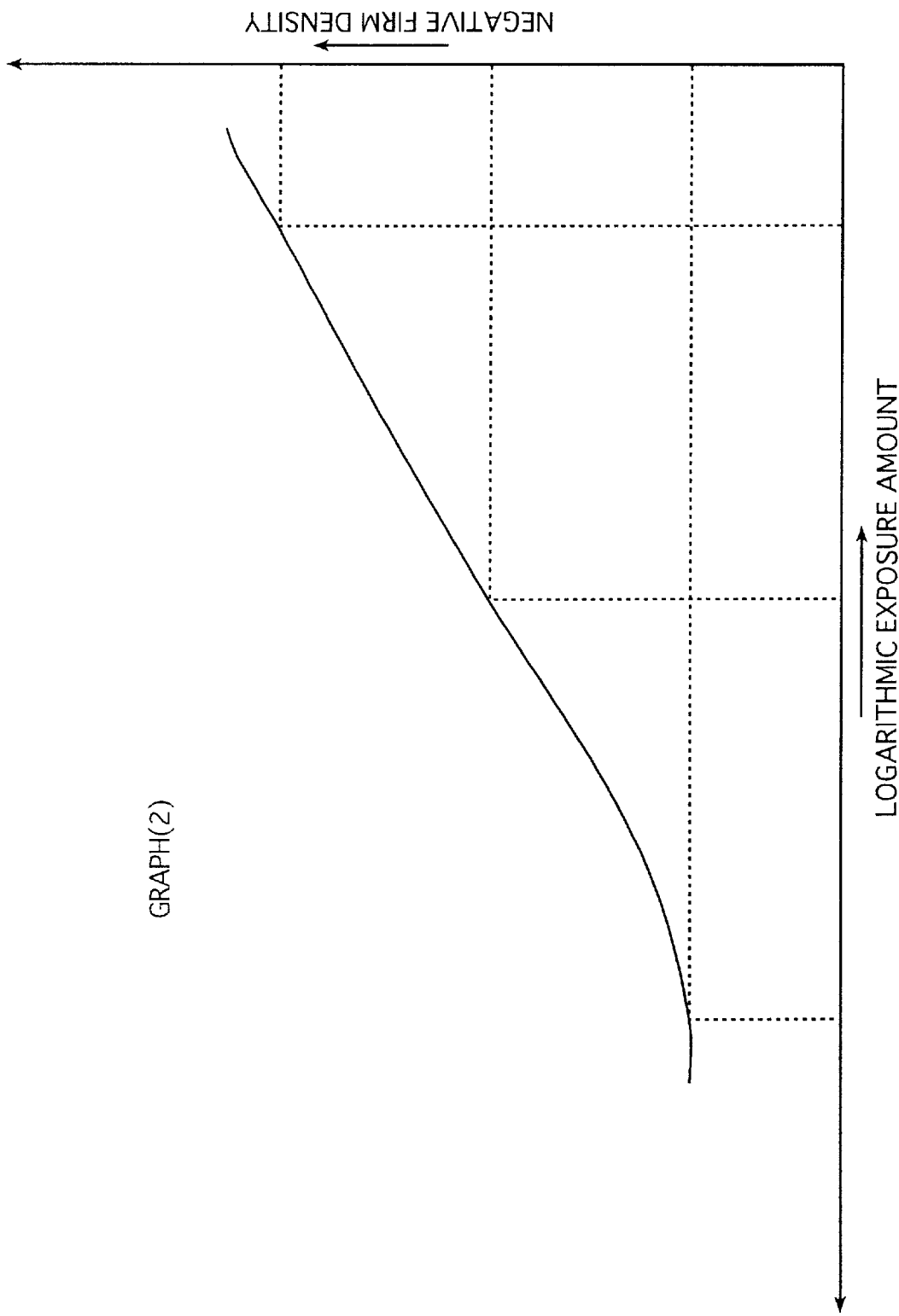
FIG. 7 is a graph showing an example of the relationship between the density of the color negative film and a logarithmic exposure amount, which is used in the antilogarithm conversion means shown in FIG. 5.

On the other hand, as to the film F, there are determined the density characteristics between the logarithmic exposure amount of the film F and the film density thereof. For example, there are density characteristics as shown in the graph of FIG. 7 (hereinafter, referred to as "graph (2)") between the logarithmic exposure amount of the film F and the negative film density thereof.

Next, the relationship between the print density and the logarithmic exposure amount is calculated from the two kinds of the density characteristics via the film density.

Figure 8:
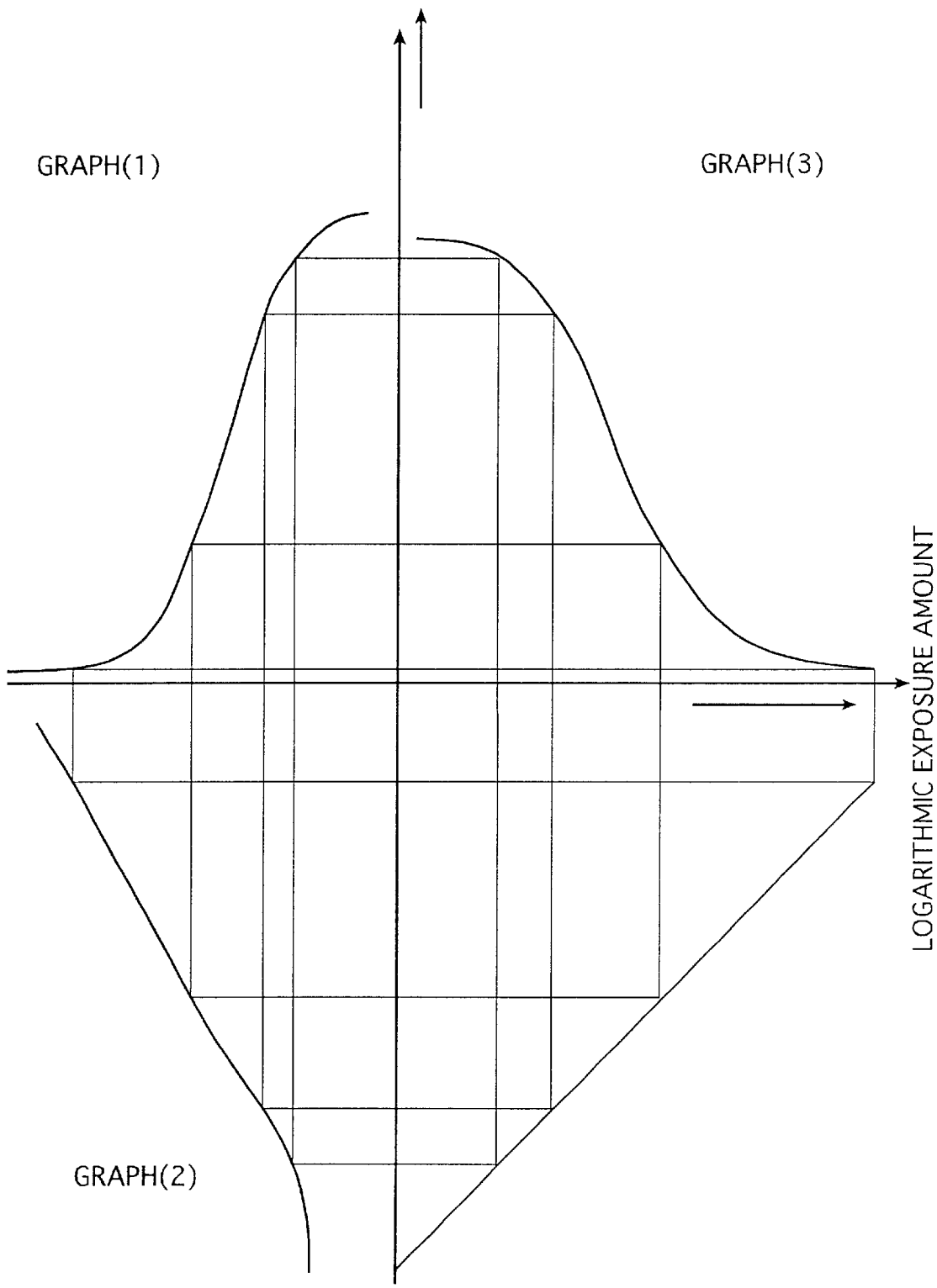
FIG. 8 is a graph showing an example of the relationship between the print density and the logarithmic exposure amount, which are obtained from the graph (1) shown in FIG. 6 and the graph (2) shown in FIG.

For example, as shown in FIG. 8, a graph (3) which shows the relationship between the print density and the logarithmic exposure amount can be obtained from the two graphs, that is, from the graph (1) showing the relationship between the print density and the negative film density and the graph (2) showing the relationship between the logarithmic exposure amount and the negative film density by arranging the magnitude of the logarithmic exposure amount through the negative film density.

Figure 9:
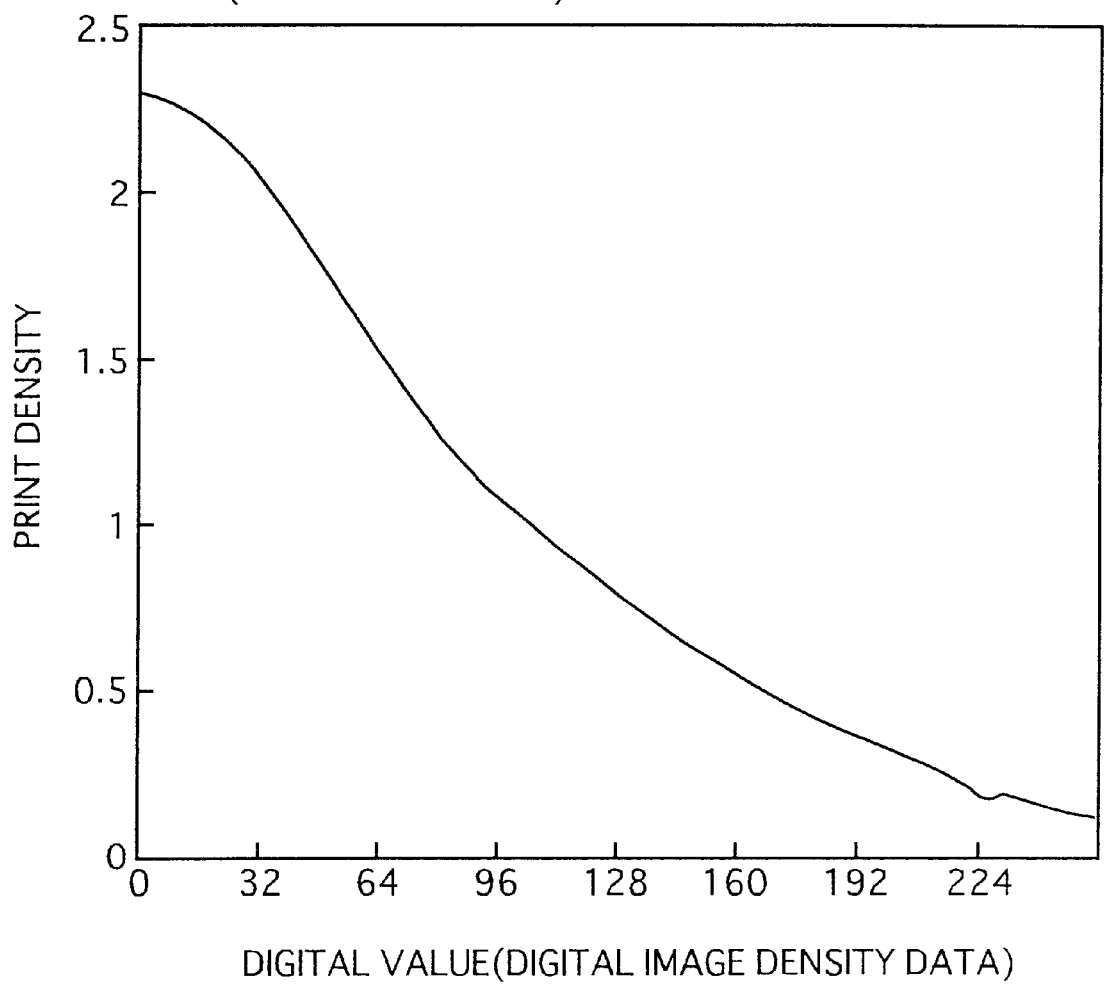
FIG. 9 is a graph showing an example of the relationship between the external output (the density data of digital image) and the print density in the image processing apparatus shown in FIG. 3.

Further, in the photoprinter 10 shown in FIG. 1, there is a predetermined relationship, for example, the relationship shown in the graph (4) of FIG. 9 between the print density and the digital image data, which has been subjected to the logarithm conversion processing by the LOG converter 38, that is, the digital image density data such as the external output from the image processing apparatus 14.

Thus, the relationship between the digital image density data and the antilogarithm amount can be determined from the relationship between the print density and the logarithmic exposure amount and the relationship between the digital image density data and the print density, which were previously obtained, through the relationship between the print density, the logarithmic exposure amount, and the antilogarithm amount data, that is, through exponential conversion.

Figure 10:
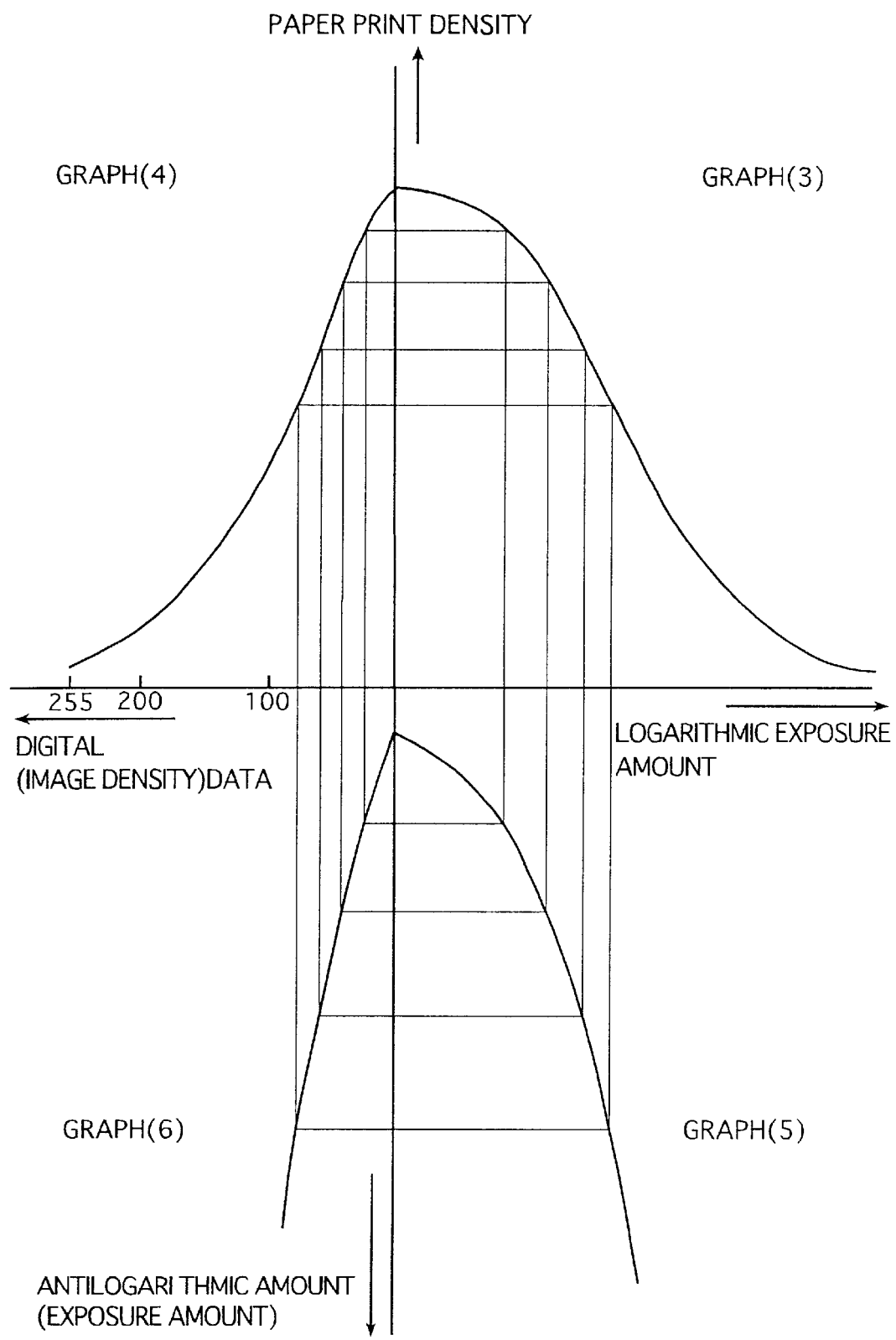
FIG. 10 is a graph showing an example of the relationship between the density data of the digital image and an antilogarithm amount, which are obtained from the graph (3) shown in FIG. 8 and the graph (4) shown in FIG. 9.

For example, a graph (6), which shows the relationship between the digital image density data and the antilogarithm amount data, can be obtained in the following manner. That is, as shown in, for example, FIG. 10, the graph (3) of FIG. 8, which shows the relationship between the print density and the logarithmic exposure amount is caused to correspond to the graph (4) of FIG. 9, which shows the relationship between the digital image density data and print density via the print density, and the digital image density data is caused to correspond to the antilogarithm amount data via the relationship between the logarithmic exposure amount and the antilogarithm amount data, that is, via a graph (5) showing the exponential conversion.

Figure 11:
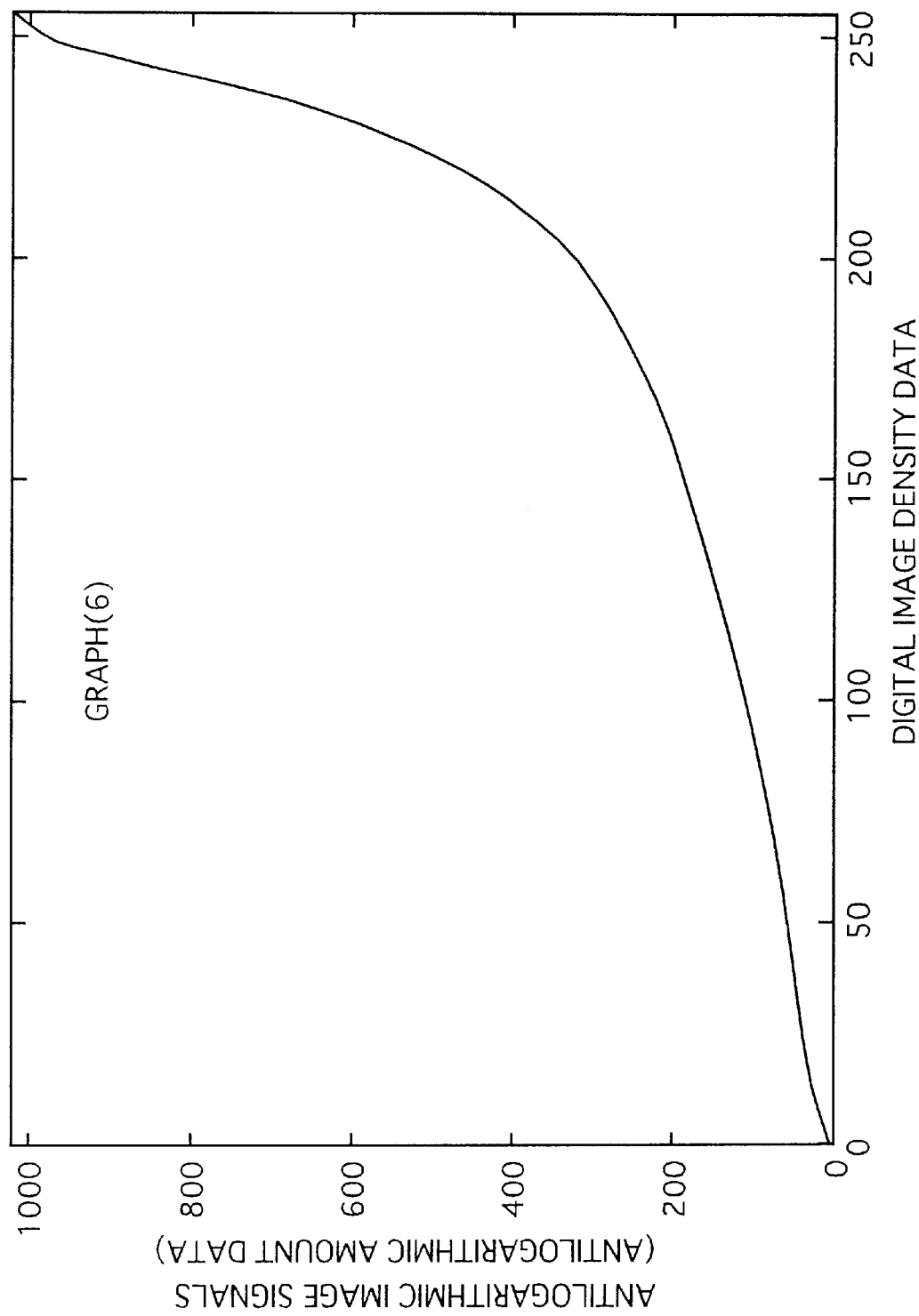
FIG. 11 is a graph showing an example of the relationship between the density data of the digital image and the antilogarithm amount, which is shown in the graph (6) of FIG. 10, over an entire region.

FIG. 11 shows an overall graph (6) which show the thus obtained relationship between the digital image density data and the antilogarithm amount data.

The exposure amount conversion means 75 carries out antilogarithm conversion processing for converting the digital image density data into the antilogarithm amount data using the relationship between the digital image density data and the antilogarithm amount data, which has been determined as described above, that is, using, for example, the graph (6) shown in FIG. 11. Since the relationship between the digital image density data and the antilogarithm amount data, which is shown in the graph (6) of FIG. 11, is ordinarily obtained by non-linear conversion, it is preferable that the exposure amount conversion means 75 carries out antilogarithm conversion processing by arranging the relationship as a one-dimensional look-up table (hereinafter, referred to as "1-D LUT") and executing interpolating operation.

It is sufficient for the density data conversion means 90, which will be described later, to inversely convert the antilogarithm amount data into the digital image density data (including logarithmic conversion) using the 1-D LUT.

The gain adjustment means 76 adjusts the antilogarithm amount data, which has been subjected to the antilogarithm conversion processing by the exposure amount conversion means 75 and which is to be added to an unsharp image to create a soft-focused image, that is, the gain of the component of at least one of the medium frequency band and the high frequency band of the antilogarithm original image signals in accordance with the degree of a soft-focusing effect. When it is desired, for example, to obtain a larger soft-focusing effect on a reproduced image, the gain adjustment means 76 increases the gains of both the components of the medium frequency band and the high frequency band of the antilogarithm original image signals, which are to be added to the unsharp image, to thereby increase the adding rate of the antilogarithm unsharp image signals. Whereas, when it is desired to obtain a smaller soft-focusing effect on the reproduced image, the gain adjustment means 76 decreases the gain of the component of the medium frequency band of the antilogarithm original image signals to thereby reduce the adding rate of the antilogarithm unsharp image signals. Note, any gain adjustment means may be used as the gain adjustment means 76 so long as it can adjust the antilogarithm original image signals by increasing or decreasing the gain of the component of at least one of the medium frequency band and the high frequency band thereof. For example, the gain of a different component of the frequency bands of the antilogarithm original image signals may be adjusted by changing a mask action when an unsharp mask is made, that is, by changing the size of the unsharp mask. Otherwise, the gain may be adjusted by extracting the components of the medium and high frequency bands of the antilogarithm original image signals using a lowpass filter, a highpass filter, a bandpass filter, or the like and by amplifying or attenuating the components of these frequency bands, respectively.

Figure 12:
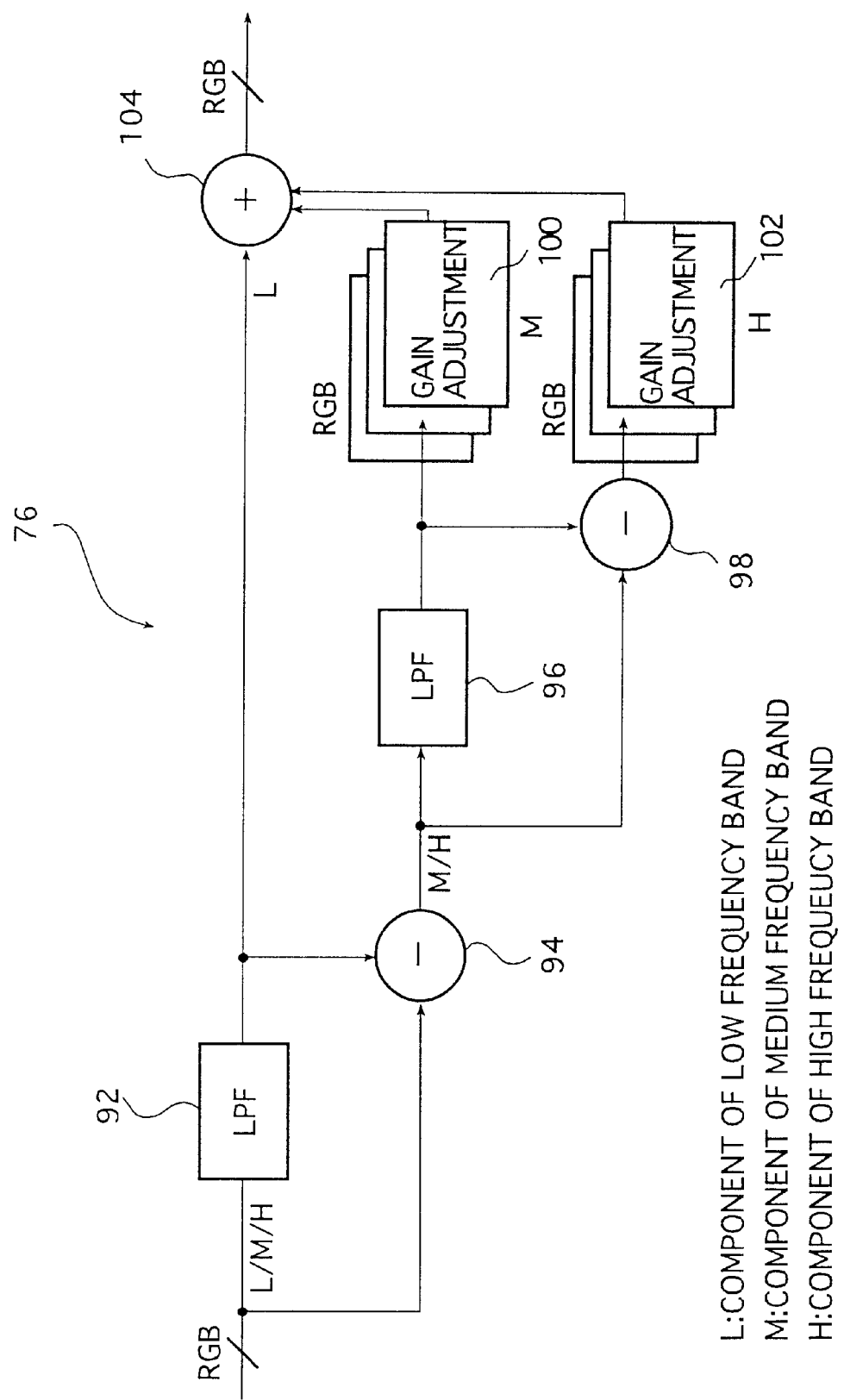
FIG. 12 is a block diagram of an embodiment of a gain adjustment means of the soft-focus processing means shown in FIG. 5.

FIG. 12 shows an embodiment of the gain adjustment means for adjusting the gain by extracting the components of the medium and high frequency bands of the antilogarithm original image signal using two lowpass filers and by amplifying or attenuating the components of these frequency bands, respectively.

The gain adjustment means 76 shown in FIG. 12 includes
a lowpass filter (hereinafter, referred to as "LPF") 92 for separating the component L of a low frequency band from the antilogarithm image data (antilogarithm original image signals) of the respective R, G and B color components;
a subtacter 94 for subtracting the component L of the low frequency band from the antilogarithm original image signals (L/M/H); a lowpass filter (hereinafter, referred to as "LPF") 96 for separating the component M of the medium frequency band from the components (M/H) of the medium and high frequency bands, which has been obtained by the subtacter 94; a subtacter 98 for obtaining the component H of the high frequency band by subtracting the component M of the medium frequency band from the components (M/H) of the medium and high frequency bands; a gain adjustment circuit 100 for amplifying or attenuating the component M of the medium frequency band of each of the R, G and B colors, which has been separated by the lowpass filter 96, to thereby adjust the gain (response) thereof; a gain adjustment circuit 102 for amplifying or attenuating the component H of the high frequency band of each of the R, G and B colors, which has been obtained by the subtacter 98, to thereby adjust the gain thereof; and an adder 104 for adding the component L of the low frequency band, which has been separated from the antilogarithm original image signals by the lowpass filter 92, to the component M of the medium frequency band, whose gain has been adjusted by the gain adjustment circuit 100 and to the component H of the high frequency band, whose gain has been adjusted by the gain adjustment circuit 102.

The illustrated gain adjustment means 76 separates the antilogarithm original image signals to the components L, M and H of the low, medium and high frequency bands using the two LPFs 92 and 96 and the two subtacters 94 and 98. However, the present invention is by no means limited thereto, that is, the number of the components of the frequency bands to be separated is not limited to the three kinds, and the components may be separated to two kinds of the components of the low and high frequency bands or may be separated to four or more kinds of components.

When the three kinds of the components of the low, medium and high spatial frequency bands are separated from each other, the frequency of the component L of the low frequency band is set to L<1 cc/mm in the spatial frequency on a print, the frequency of the component M of the medium frequency band is set to 1 cc/mm≦M≦3 cc/mm, and the frequency of the component H of the high frequency band is set to H>3 cc/mm. However, the present invention is not limited thereto and the frequency may be suitably set depending upon the antilogarithm original image signals, and the like.

Further, the gain adjustment circuits 100 and 102 in the gain adjustment means 76 may be any gain adjustment circuits so long as they can amplify or attenuate the component M of the medium frequency band and the component H of the high frequency band in accordance with the degree of a required soft-focusing effect, and, for example, circuits using an amplifier, a LUT and the like can be exemplified. In addition, the amounts of the gains of the component M of the medium frequency band and the component H of the high frequency band, which are to be adjusted by the gain adjustment amplifiers 100 and 102, that is, the values to be amplified and to be attenuated may be set depending upon the degree of the required soft-focusing effect.

The luminance signal conversion means 78 is a site where the R, G and B color signals of the antilogarithm original image signals, which have been subjected to the antilogarithm conversion processing by the exposure amount conversion means 75, are converted, into an antilogarithm luminance signal Y by assigning weights to the R, G and B color signals.

The lowpass filter 80 constitutes a means for creating antilogarithm unsharp image (unsharp mask) signals. In the illustrated example, the lowpass filter 80 is a site where the antilogarithm unsharp image signals are created by filtering the low frequency component of the antilogarithm luminance signal, which has been obtained by the luminance signal conversion means 78. Therefore, one kind of the antilogarithm unsharp image signals is used to all the three kinds of R, G and B signals.

The dynamic range compression means 82 is a site where the dynamic ranges of the antilogarithm unsharp image signals composed of the low frequency component, which has been created by the lowpass filter 80, are compressed by means of a LUT, a multiplier (MUL), and the like. When it is instructed to create the soft-focused image, which is the feature of the present invention, the dynamic range compression means 82 does not carry out any processing to the antilogarithm unsharp image signals and supplies them to the image signal combining means 88 as they are. Otherwise, when the soft-focused image is to be created, the antilogarithm unsharp image signals, which have been output from the lowpass filter 80, may be directly supplied to the image signal combining means 88 by passing through the dynamic range compression means 82 without being subjected to any processing in it or bypassing the dynamic range compression means 82.

In the illustrated soft-focus processing means 72, the antilogarithm unsharp image signals are created by the lowpass filter 80 from the antilogarithm luminance signal, which has been converted from the antilogarithm original image signals through the luminance signal conversion means 78. However, the present invention is by no means limited thereto, and the antilogarithm unsharp image signals may be crated from each of the R, G and B antilogarithm original image color signals instead of that they are created from the antilogarithm luminance signal. The lowpass filter 80 for creating the antilogarithm unsharp image signals may be an FIR filter or an IIR filter. Further, the means for creating the antilogarithm unsharp image signals is not limited to the lowpass filter 80. That is, a smoothing filter such as a median filter may be used or the combination of these filters may be used. Further, since the lowpass filter 80 only processes the thee-dimensional R, G and B color signals or the antilogarithm luminance signal, which has been converted into the one-dimensional signal, a one-dimensional filter may be used as the lowpass filter 80.

The image density determination means 84 is a site where the density of the image of one frame is determined in each of image density regions from the original image signals, which have been subjected to the tone conversion by the tone conversion means 74. The image density determination means 84 may determine the image density regions using the antilogarithm original image signals.

The adding rate adjustment means 86 is a site for adjusting the adding rate ($\alpha$: the adding rate of the unsharp image signal) at which the antilogarithm unsharp image signals, which have been created by the lowpass filter 80, are added to the antilogarithm original image signals, which have been subjected to the antilogarithm conversion processing by the exposure amount conversion means 75, or the antilogarithm image signals, in which the gains of the medium and high frequency bands have been adjusted by the gain adjustment means 76.

The image signal combining means 88 is a site where antilogarithm dodged image signals are created, in dodging processing, by adding the antilogarithm original image signals to the antilogarithm unsharp image signals, in which the dynamic range is compressed, using a LUT, a multiplier, an adder and the like. That is, the image signal combining means 88 combines images so as to create a color image which has no dropout formed to a highlight portion and no blocked-out formed a shadow portion. In the soft-focused image creation processing, the image signal combining means 88 is a site where the antilogarithm original image signals or the gain-adjusted antilogarithm image signals are added to the antilogarithm unsharp image signals at a prescribed adding rate ($1-a\alpha:\alpha$), for example, at 75% (1:3), or where the antilogarithm original image signals or the gain-adjusted antilogarithm image signals are added to the antilogarithm unsharp image signals at the adding rate $\alpha$, which has been adjusted by the adding rate adjustment means 86, to thereby create antilogarithm soft-focusing image signals. That is, the image signal combining means 88 combines images so as to create the soft-focused image.

The adding rate $\alpha$ and, in particular, the prescribed adding rate $\alpha$ may be input to the key correcting subsection 60 in the condition setting section 48 by the operator through the keyboard 18a and the mouse 18b of the manipulating unit 18 and directly supplied to the image signal combining means 88 via the parameter coordinating subsection 62 in the condition setting section 48. However, the adding rate $\alpha$ and, in particular, the prescribed adding rate $\alpha$ may be set by the set-up subsection 58 and the key correcting subsection 60 in the condition setting section 48 in accordance with the prescanned image data and supplied to the adding rate adjustment means 86 via the parameter coordinating subsection 62, and set by the rate adjustment means 86. Otherwise, the density of one frame may be determined for each of the regions from the original image signals, which have been determined by the image density determination means 84, and the adding rate $\alpha$ may adjusted for each of the regions by the adding rate adjustment means 86. When the adding rate $\alpha$ is adjusted by the adding rate adjustment means 86, it may be adjusted for each of the density regions, which have been separated by the image density determination means 84 using a prescribed threshold value, or the adding rate $\alpha$ may be smoothly set for each of the density regions, which have been determined by the image density determination means 84 using a LUT.

The density data conversion means 90 is a site where the antilogarithm amount data such as the antilogarithm dodging image signals, the antilogarithm soft-focusing image signals, and the like, which has been created as described above, is converted into the digital image density data. That is, the density data conversion means 90 carries out the conversion processing inverse to the antilogarithm conversion processing including the exponential conversion, which is carried out in the exposure amount conversion means 75, so that the image density data represented by the logarithmic scale, which is ordinarily handled by the image processing apparatus 14, is obtained.

For this purpose, the density data conversion means 90 carries out (logarithmic) conversion processing for converting the antilogarithm amount data into the digital image density data, that is, into the data of the so-called logarithmic scale using inversely the aforesaid relationship between the digital image density data and the antilogarithm amount data, for example, the graph (6) shown in FIG. 11 which is used in the exposure amount conversion means 75. When the relationship between the digital image density data and the antilogarithm amount data as shown in the graph (6) of FIG. 11 is arranged as the 1-D LUT in the exposure amount conversion means 75, it is preferable to carry out the inverse conversion using the 1-D LUT.

The soft-focus processing means 72 is arranged to carry out image processing so as to subject image data to any one of the soft-focus processing and the dodging processing. As a result, the soft-focus processing means 72 can reproduce, on the one hand, a color soft-focused image having flare feeling, as if it was processed in the analog mode. In particular, when gain adjustment, adding rate adjustment, and adding rate adjustment according to image density are carried out, the soft-focus processing means 72 can reproduce a color soft-focused image which has the flare feeling as if it was processed in the analog mode as well as does not have unsharpness at the core of the image and uneven feeling due to graininess. In addition, the soft-focus processing means 72 can reproduce, on the other hand, a color image which is compressed to eliminate blocked-outs formed to the high density portion of the image, dropouts formed to the low density portion thereof and unsharpness at the edge thereof.

When the soft-focused image is created, the image data, which has been supplied to the soft-focus processing means 72, is arranged as original image signals with their tone signal level converted by the tone conversion means 74. Then, the original image signals are converted into antilogarithm original image signals by the exposure amount conversion means 75. Thereafter, the antilogarithm original image signals are supplied to a main path, where the gain of at least one of the components of the medium and high frequency bands of the antilogarithm original image signals is adjusted by the gain adjustment means 76 so as to create gain-adjusted antilogarithm original image signals, which are supplied to the image signal combining means 88.

In contrast, the antilogarithm original image signals, which have been output to a bypass from the exposure amount conversion means 75, are supplied to the luminance signal conversion means 78. The luminance signal conversion means 78 assigns weights to the R, G and B color signals of the antilogarithm original image signals in accordance with a human sense of sight by means of the following formula and converts the antilogarithm original image signals into the antilogarithm luminance signal Y.

$$Y=aR+bG+cB$$

where, a+b+c=1 and a, b and c>0
As an example, a=0.3, b=0.59 and c=0.11 can be exemplified.

Next, the antilogarithm luminance signal Y is supplied to the lowpass filter 80 and the medium and high frequency components thereof are removed therewith so that antilogarithm unsharp image signals, which are composed of the antilogarithm luminance signal Y including only a low frequency component, are created. Since the medium and high frequency components are removed from the thus obtained antilogarithm unsharp image signals, the antilogarithm unsharp image signals correspond to an unsharp image.

The antilogarithm unmask image signals, which has been supplied from the lowpass filter 80, are input to the image signal combining means 88 passing through the density dynamic range compression means 82 without being subjected to any processing in it.

Further, the original image signals, which have been output from the tone conversion means 74, are supplied to the image density determination means 84. In the image density determination means 84, the image density of the original image signals is determined by the density region in the image of one frame, that is, by, for example, a density threshold value or a plurality of threshold values, and the original image signals are thereby separated to a plurality of density regions. Subsequently, the adding rate adjustment means 86 adjusts the adding rate α in accordance with the thus determined densities of a plurality of the density regions, and the adding rates α having been adjusted are assigned to a plurality of the density regions, which have been separated by the image density determination means 84 and supplied to the image signal combining means 88.

Thereafter, in the image signal combining means 88, the antilogarithm image signals, which have been supplied from the main path and whose gains have been adjusted by the gain adjustment means 76, are combined with the antilogarithm unsharp image signals, which has been supplied from the bypass and processed by the lowpass filter 80, in each of a plurality of the density regions at the adding rates α, which have been input from the adding rate adjustment means 86 and adjusted in accordance with the image. Antilogarithm soft-focusing image signals are thereby obtained.

Finally, in the density data conversion means 90, the antilogarithm soft-focusing image signals are converted into soft-focusing image signals which is the density data represented by the logarithmic scale.

The thus obtained soft-focusing image signals have an optimum soft-focusing effect. That is, the soft-focusing image signals can be reproduced as a color soft-focused image having an effect near to flare which can be obtained in actual soft-focusing in an image recorded by a camera. The color soft-focused image is arranged such that no unsharpness is caused to the core of the reproduced image at a portion such as an edge where it is desired to leave the core of the image. Further, uneven feeling due to graininess is not caused to the portions of the color soft-focused image such as a skin and a highlight portion where it is desired to produce soft feeling.

Incidentally, when the image data is subjected the soft-focus processing on a density axis without being subjected to antilogarithm conversion processing contrary to the above mentioned, a finished image cannot produce the flare feeling which can be obtained in a soft-focused image actually processed in the analog mode, although the finished image has soft feeling. When, however, the image data is subjected to the antilogarithm conversion processing and then subjected to the frequency processing based on the antilogarithm amount, the effect of the frequency processing greatly appears on the high density side of a reproduced image, whereas, the effect is reduced on the low density side thereof. Accordingly, there is an advantage that when a soft-focused image is created through the antilogarithm conversion processing, the reproduced image is greatly softened on the high density side, and an soft-focusing effect near to flare, which can be obtained by the processing in the analog mode, can be obtained.

Whereas, when the dodging processing is carried out, the image data, which has been input to the soft-focus processing means 72, is first arranged as the original image signals with their tone signal level converted by the tone conversion means 74, then the original image signals are converted into the antilogarithm original image signals by the exposure amount conversion means 75. Thereafter, the antilogarithm original image signals are directly supplied to the image signal combining means 88 through the main path.

In contrast, the antilogarithm original image signals, which have been output to the bypass from the exposure amount conversion means 75, are supplied to the luminance signal conversion means 78. After the antilogarithm original image signals are converted into the antilogarithm luminance signal Y, the antilogarithm luminance signal Y is supplied to the lowpass filter 80 to thereby create the antilogarithm unsharp image signals. The thus obtained antilogarithm unsharp image signals are supplied to the dynamic range compression means 82, where the dynamic range of the antilogarithm unsharp image signals is compressed and the resulting antilogarithm unsharp image signals are supplied to the image signal combining means 88.

Thereafter, the image signal combining means 88 combines the antilogarithm original image signals, which have been supplied through the main path, with the antilogarithm unsharp image signals, which has been supplied through the bypass and whose dynamic range has been compressed by the density dynamic range compression means 82, at the adding rate α. Antilogarithm dodging image signals are thereby obtained.

Finally, the density data conversion means 90 converts the antilogarithm dodging image signals into dodging processing color image signals which are the density data represented by the logarithmic scale.

The thus obtained dodging processing color image signals are signals having an optimum dodging effect. That is, the dynamic range of only the low frequency component of the signals is compressed and the dynamic ranges of the high and medium frequency components thereof are not compressed. Therefore, the signals can be reproduced as a color image in which no dropout is caused to the low density (highlight) portion of an original image and no blocked-out is caused to the high density (shadow) portion thereof as well as an edge is not unsharpened.

Incidentally, when image data, which has been subjected to the antilogarithm conversion processing and then subjected to the dodging processing as described above, is subjected to the frequency processing based on an exposure amount, the effect of the frequency processing greatly appears on the high density side of a dodged image and is reduced on the low density side thereof. Thus, when a dodged image is created from image data after the image data is subjected to the antilogarithm conversion processing, the dodging effect of the image, that is, the effect of dynamic range compression and extension is increased on the high density side of the dodged image and is decreased on the low density side thereof. As a result, there is an advantage that the dodged image has no block-out caused to a shadow portion and no dropout caused to a highlight portion and that the edge of the dodged image is not unsharpened.

Incidentally, the luminance signal conversion means 78 converts the R, G and B antilogarithm color signals into the one-dimensional antilogarithm luminance signal Y, which corresponds to the gray component of a color image. Accordingly, the gray component is mixed with the color soft-focused image, which has been reproduced based on the soft-focusing image signals which have been obtained by combining the antilogarithm unsharp image signals processed through the bypass of the soft-focus processing means 72 and by inversely converting the combined antilogarithm unsharp image signals into the logarithm scale data. There is caused thereby a problem that saturation drops. To cope with this problem, it is preferable in the illustrated example to prevent the drop of the saturation of the soft-focused image, which has been obtained by the combination of the image signals, in the following manner. That is, the tone of the image signals is previously converted by the tone conversion means 74 so that the tone is made equal to the tone of the combined image signals, which are obtained when the antilogarithm original image signals supplied through the main path are combined with the antilogarithm unsharp image signals processed through the bypass and the thus combined signals are inversely converted into the logarithm scale data.

A technology for preventing the drop of the saturation is of the soft-focused image not specifically limited and any well-known saturation preventing technologies such as the saturation preventing technology for a soft-focused image, which has been disclosed by the applicant in Japanese Unexamined Patent Publication No. 9-172600, and the like may be used.

In the image processing apparatus 14 of the present invention, various types of the soft-focus processing means 72 may be arranged, so long as they carry out the soft-focus processing by converting the image density data represented by the logarithmic scale into the antilogarithm amount data. More specifically, the above various components for carrying out the soft-focus processing may be combined and the sequence in which the processing steps are executed may be changed, in accordance with a required soft-focusing effect. Otherwise, the soft-focus processing means 72 may be arranged to include all of the components describing above for carrying out the soft-focus processing so that a processing to be carried out by the soft-focus processing means 72 can be changed according to a required soft-focusing effect.

When it is desired, for example, to increase the soft-focusing effect or to somewhat decrease the soft-focusing effect, it is sufficient that the soft-focus processing means 72 is provided with at least the unsharp image signal creation means including the exposure amount conversion means 75, the gain adjustment means 76, the lowpass filter 80 and the like, the adding rate adjustment means 86, the image signal combining means 88, and the density data conversion means 90.

When it is desired to increase the soft-focusing effect, the antilogarithm image signals, which have been obtained from the antilogarithm original image signals by increasing the gains of the medium and high frequency bands thereof by the gain adjustment means 76, and the antilogarithm unsharp image signals, which have been created by the lowpass filter 80, may be prepared. Then, a soft-focused image may be created by combining the antilogarithm image signals with the antilogarithm unsharp image signals by the image signal combining means 88 at the adding rate α of the antilogarithm unsharp image signals which has been increased by the adding rate adjustment means 86.

Incidentally, many portions, in which the edges of an image are exhibited, are contained in the medium and high frequency bands, and persons are most sensitive to these portions. Thus, when the soft-focusing effect is enhanced, that is, when the adding rate of an unsharp image is increased, the human eyes tend to feel that the edges are simply unsharp images. In the present invention, however, when the soft-focusing effect is enhanced, an image, in which a soft-focusing effect is enhanced while leaving edges, can be created by using an image, in which the medium and high frequency components have been enhanced, that is, the edge components have been enhanced, in place of an original image.

Whereas, when it is desired to reduce the soft-focusing effect, a soft-focused image can be created by preparing image signals, which have been obtained from the original image signals by decreasing the gain of the medium frequency band thereof by the gain adjustment means 76, and unsharp image signals, and combining image signals with the unsharp image signals at the adding rate of the gain-adjusted image signal, which has been increased by the adding rate adjustment means 86, that is, at the lowered adding rate α of the unsharp image signals.

By the way, when the soft-focusing effect is lowered, that is, when the adding rate of the unsharp image is reduced, the graininess of a human skin tends to become perceptible. To cope with this problem, the present invention can create an image having a small soft-focusing effect, in which the graininess is restricted while leaving edges, by using an image, in which the signals of the medium frequency component including the portions, whose noise is near to that of the skin, except the edges are restricted, in place of the original images.

Further, when it is desired to more increase the soft-focusing effect or to more decrease the soft-focusing effect, the soft-focus processing means 72 may be provide with at least the unsharp image signal creating means including the exposure amount conversion means 75, the lowpass filter 80 and the like, the image density determination means 84, the adding rate adjustment means 86, the image signal combining means 88, and the density data conversion means 90. Further, the soft-focus processing means 72 may provided with the gain adjustment means 76, when necessary.

In this case, when the original image signals, the image signals, in which the gains of the medium and high frequency components are increased, or the image signals, in which the gain of the medium frequency component is decreased, is to be combined with the unsharp image signals, which have been processed by the lowpass filter 80, the adding rate α is adjusted in accordance with the image density, which has been determined by the image density determination means 84; For example, the adding rate a of the unsharp image signals is increased in the portion where a density is high (high density region), whereas the adding rate a of the unsharp image signals is lowered in the portion where a density is low (low density region).

With is arrangement, a soft-focused image can be created which has a flare effect near to that appearing to a high contrast portion in actual soft-focusing, which can be obtained when an image is recorded by a camera through multiple exposure.

Further, it is possible to dispose the exposure amount conversion means 75 downstream of the gain adjustment means 76 and the luminance signal conversion means 78, to adjust the gains of the medium and high frequency components of the original image signals, in which the tone signal level has been converted by the tone conversion means 74 or to create the luminance signal from the original image signals by the luminance signal conversion means 78, and thereafter to subject the gain-adjusted image signals and the luminance signal to the antilogarithm conversion processing through the antilogarithm conversion means 75 to thereby create the gain-adjusted antilogarithm image signals and the antilogarithm luminance signal.

In the above example, the soft-focus processing means 72 creates the soft-focused image or the dodged image using the antilogarithm unsharp image signals, which have been subjected to the antilogarithm conversion processing. However, a dodging processing means may be provided independently of the soft-focus processing means 72 and the dodged image may be created using the image signals represented by the logarithmic scale similarly to the conventional manner.

Further, in the above example, the frequency processing means 70, which subjects the image data, which has been photoelectrically magnified to have the prescribed output size and the prescribed output pixel density by the electronic magnification means 68, to the frequency processing such as the edge enhancement and the like, is provided independently of the soft-focus processing means 72 for changing the dynamic range of the density of the image data or subjecting the image data to the soft-focus processing. In the above arrangement, the image data is subjected to the antilogarithm conversion processing and then subjected to the soft-focusing processing or the dodging processing only by the soft-focus processing means 72. However, the present invention is by no means limited to the above arrangement, and the frequency processing means 70 may be arranged as a sharpness enhancement processing means 71 as shown in, for example, FIG. 13 so that the image data is thereby subjected to the antilogarithm conversion processing and then subjected to sharpness enhancement processing.

The reason is that when a color image is reproduced on a finished print from a color negative film and a color reversal film, the effect of not only the soft-focus processing but also the effect of the frequency processing such as the sharpness enhancement, which is carried out after the execution of the antilogarithm conversion processing for converting the digital image density data to the antilogarithm amount, are increased on the high density side of the reproduced color image and reduced on the low density side thereof.

Figure 14:
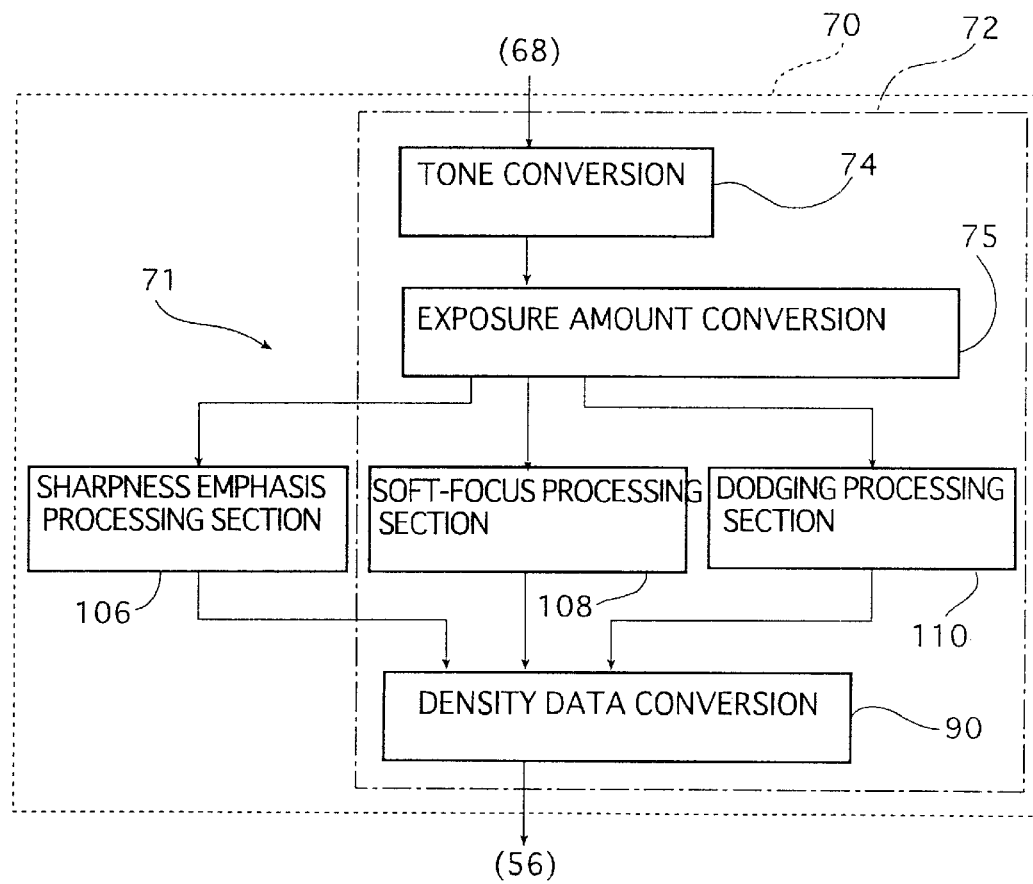
FIG. 14 is a block diagram of still another example of the frequency processing means in the image processing subsection shown in FIG. 4.

Further, as shown in FIG. 14, it is also possible that the soft-focus processing means 72 is not provided independently of the frequency processing means 70, but the frequency processing means 70 is provided with the sharpness enhancement processing means 71 and the soft-focus processing means 72, which carry out the antilogarithm conversion processing and thereafter carry out the various processing steps in cooperation with each other so that they execute the antilogarithm conversion processing and then execute the respective steps of the sharpness enhancement processing, the soft-focus processing, and the dodging processing in cooperation with each other.

Figure 13:
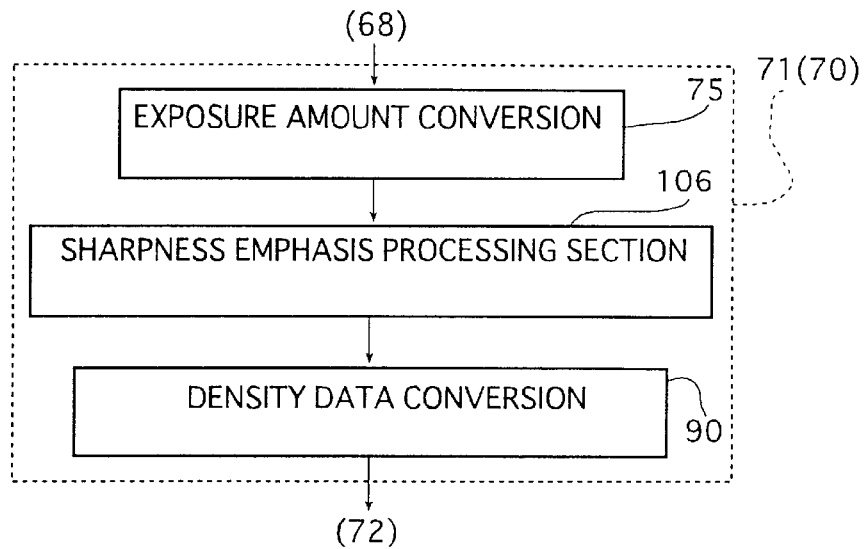
FIG. 13 is a block diagram of another example of a frequency processing means in the image processing subsection shown in FIG. 4.

The frequency processing means 70 shown in FIG. 13 constitutes the sharpness enhancement processing means 71. The sharpness enhancement processing means 71 includes the antilogarithm conversion means 75, a sharpness enhancement processing section 106, and a density data conversion means 90, wherein the antilogarithm conversion means 75 converts the image data, which has been photoelectrically magnified to have the prescribed output size and the prescribed output pixel density by the electronic magnification means 68, into antilogarithm image data (antilogarithm original image signals); the sharpness enhancement processing section 106 subjects an image to sharpness enhancement processing based on the antilogarithm original image signals; and the density data conversion means 90 converts the sharpness-enhanced antilogarithm image signals into density signals.

The sharpness enhancement processing section 106 is a site where processing for emphasizing the edge and contour of a color image, that is, so-called sharpness enhancement processing is carried out. The sharpness enhancement processing section 106 is not particularly limited in the present invention, and any device may be used so long as it can carry out known sharpness enhancement methods.

It is preferable that the device can execute, for example, an unsharp mask (USM) method and a graininess restricting sharpness method such as the sharpness enhancement method which is disclosed in, for example, U.S. Pat. No. 4,812,903, Japanese Unexamined Patent Publication No. 63-26783, Japanese Patent Application Publication No. 3-502975, and Japanese Unexamined Patent Publication No. 9-22460 which was filed by the applicant, and so forth.

The sharpness enhancement processing carried out by the unsharp mask (USM) method is such that unsharp mask signals Sus are created from color original image signals by carrying out average processing for averaging the peripheral pixels of a prescribed mask size, smoothing processing, and filtering processing by means of a lowpass filter, a median filter and the like. Then, sharpness signals Ss are created by carrying out unsharp mask processing according to the following formula.

$$SS = Sorg + K \cdot (Sorg - Sus)$$

where, Sorg shows color original image signals and K is a sharpness enhancement coefficient.

In the sharpness enhancement processing carried out by the unsharp mask (USM) method, the degree of sharpness enhancement is adjusted, that is, sharpness is adjusted by causing the value of the sharpness enhancement coefficient K to depend upon at least one of the position and direction of an image and the pixel value thereof.

As to the graininess restricting sharpness emphasizing method, the graininess restricting sharpness emphasizing processing disclosed in Japanese Patent Application Publication No. 3-502975 is carried out in the following manner. That is, the flat portion of a color image and the texture and edge thereof are detected from the color image and dispersed by a locally-dispersing method; then, noise and graininess are restricted by reducing the value of the sharpness enhancement coefficient K of the above formula in the flat portion and increasing the value in the texture and edge so as to emphasize the texture and the edge, whereby sharpness is enhanced. Therefore, when this method is used in the present invention, the sharpness of an image can be adjusted depending upon the position of the image in order to express a near-and-far-effect in such a manner that the value of the sharpness enhancement coefficient K to be used is changed in the flat portion of the image and in the texture and the edge thereof as well as the sharpness is adjusted by causing the value of the sharpness enhancement coefficient K to depend upon at least one of the position and the direction of the image and the pixel value thereof similarly to the above case.

In the graininess restricting sharpness enhancement processing disclosed in U.S. Pat. No. 4,812,903, Japanese Unexamined Patent Publication No. 63-26783 and the like, color image signals are subjected to filter processing to separate the high frequency component in the color image signals from the low frequency component thereof, enhancement processing is applied only to the high frequency component, and then the high frequency component is combined with the low frequency component. Accordingly, in the above sharpness enhancement processing, the sharpness of an image can be adjusted for near-and-far-effect processing by changing not only the degree of enhancement of the high frequency component, for example, an enhancement coefficient and a gain but also the intensity of processing to be applied to the low frequency component, for example, an enhancement coefficient and a gain while causing them to depend upon the position and direction of the image as well as the pixel value thereof.

In the graininess restricting sharpness enhancement processing disclosed in Japanese Unexamined Patent Publication No. 9-22460 filed by the applicant, color original image signals are separated to a low frequency component, a medium frequency component, and a high frequency component; a luminance component is preferably extracted from the medium frequency component and the high frequency component; then, the high frequency component is enhanced based on only the luminance component and the medium frequency component is restricted; and thereafter the low, medium and high frequency components are combined with each other. In this case, the sharpness enhancement processing section 106 may comprises, for example, the gain adjustment means 76, which is shown in FIG. 12, of the soft-focus processing means 72. Then, the sharpness enhancement processing may be carried out by reducing the gain of the extracted medium frequency component based on antilogarithm original image signals and increasing the gain of the high frequency component so as to restrict graininess.

As shown in FIG. 14, the frequency processing means 70 includes both the sharpness enhancement processing means 71 shown in FIG. 13 and the soft-focus processing means 72 shown in FIG. 5. More specifically, the frequency processing means 70 includes the tone conversion means 74, the exposure amount conversion means 75, the sharpness enhancement processing section 106, a soft-focus processing section 108, a dodging processing section 110 and the density data conversion means 90. In the above arrangement, the tone conversion means 74 converts the tone signal level of the image data, which has been photoelectrically magnified to have the prescribed output size and the prescribed output pixel density by the electronic magnification means 68, and arranges the image data as original image signals; the exposure amount conversion means 75 converts the original image signals into antilogarithm original image signals; the sharpness enhancement processing section 106 subjects an image to sharpness enhancement processing based on the antilogarithm original image signals; the soft-focus processing section 108 creates a soft-focused image; the dodging processing section 110 subjects the image to dodging processing; and the density data conversion means 90 converts the antilogarithm image signals whose sharpness has been enhanced, created antilogarithm soft-focusing image signals, and dodging antilogarithm image signals in which the dynamic range of the image has been compressed and extended into density signals.

The frequency processing means 70 shown in FIG. 14 may be arranged to carry out only any one of the sharpness enhancement processing step, the soft-focus processing step and the dodging processing step. Otherwise, the frequency processing means 70 may apply at least two of these processing steps to one image. The soft-focus processing section 108 includes at least the luminance signal conversion means 78, the lowpass filter 80 and the image signal combining means 88, which are shown in FIG. 5, and further includes some or all of the gain adjustment means 76, the image density determination means 84 and the adding rate adjustment means 86, when necessary. The dodging processing section 110 includes the luminance signal conversion means 78, the lowpass filter 80, the density dynamic range compression means 82 and the image signal combining means 88 which are shown in FIG. 5. It is needless to say, however, that the components which are common to the soft-focus processing section 108 and the dodging processing section 110 are commonly used by them.

When the sharpness enhancement processing is carried out using the density data without carrying out the antilogarithm conversion processing, there is a drawback that the graininess of a human skin is deteriorated as described above, although an image is sharpened. In contrast, when the antilogarithm conversion processing is carried out and thereafter the frequency processing carried out based on the exposure amount, the effect of the frequency processing is increased on the high density side of the image and reduced on the low density side thereof. Consequently, when the sharpness enhancement processing is carried out after the execution of the antilogarithm conversion processing, there is an advantage that the sharpness of the image can be enhanced while restricting the deterioration of the graininess of the human skin.

The aforesaid example applies the image processing to the image data represented by the logarithmic scale, which has been photoelectrically read from the color image carried on the film F such as a color negative film, a color reversal film and so forth. However, the present invention is by no means limited thereto and it may apply the image processing to the image data represented by the scale, which is shown by the following formula, such as the image data (density data) of a color image, which has been recorded by a direct recording camera (that is, a camera using a digital recording medium) such as a digital camera, a digital video camera or the like and the image data of a color image displayed on a monitor.

$$D=C_1+C_2E^\gamma$$

where, D shows density data, E shows exposure amount data, $C_1+C_2$ are constants, and $\gamma$ is power exponent.

Incidentally, in the case of, for example, the digital camera, signals obtained in photographing are digital density data which is represented by input signals (that is, exposure amount corresponding to the luminance of the subject or the intensity of the incident light) to about the 1/2.2 power. Thus, the soft-focus processing means 72 shown in FIG. 5, the sharpness enhancement processing means 71 shown in FIG. 13 and the exposure amount processing means 75 in the frequency processing means 70 shown in FIG. 14 convert the thus obtained digital data to exposure amount data (exposure amount image signals) which is represented by the digital image data to the 2.2 power. Whereas, the density data conversion means 90 inversely converts the processed exposure amount image signals (exposure amount data), which have been subjected to various kinds of processing such as the sharpness enhancement processing, the soft-focus processing, the dodging processing and the like, to digital density data which is represented by the processed antilogarithm image signals to the 1/2.2 power.

In the present invention, it should be noted that the constants $c_1$ and $c_2$ and the power exponent $\gamma$ in the above formula are not limited to those which are constant over the entire range of the exposure amount data E, and they may change depending upon the range of the exposure amount data E.

For example, in the case of the directly-recording camera, when a subject reflectance R (%), which corresponds to the subject luminance data, is used as the exposure amount data and when a digital luminance output value (for example, 8-bit QL value) is used as the digital density data, it is preferable to represent the digital luminance output value by the following three formulas.

$$QL=81.922R/8 \ (0 \leq R \leq 8)$$

$$QL=(R/83.2)^{0.45} \ (8 \leq R \leq 83.2)$$

$$QL\ 32\ 40R/83.2+195 \ (83.2 \leq R)$$

Figure 15:
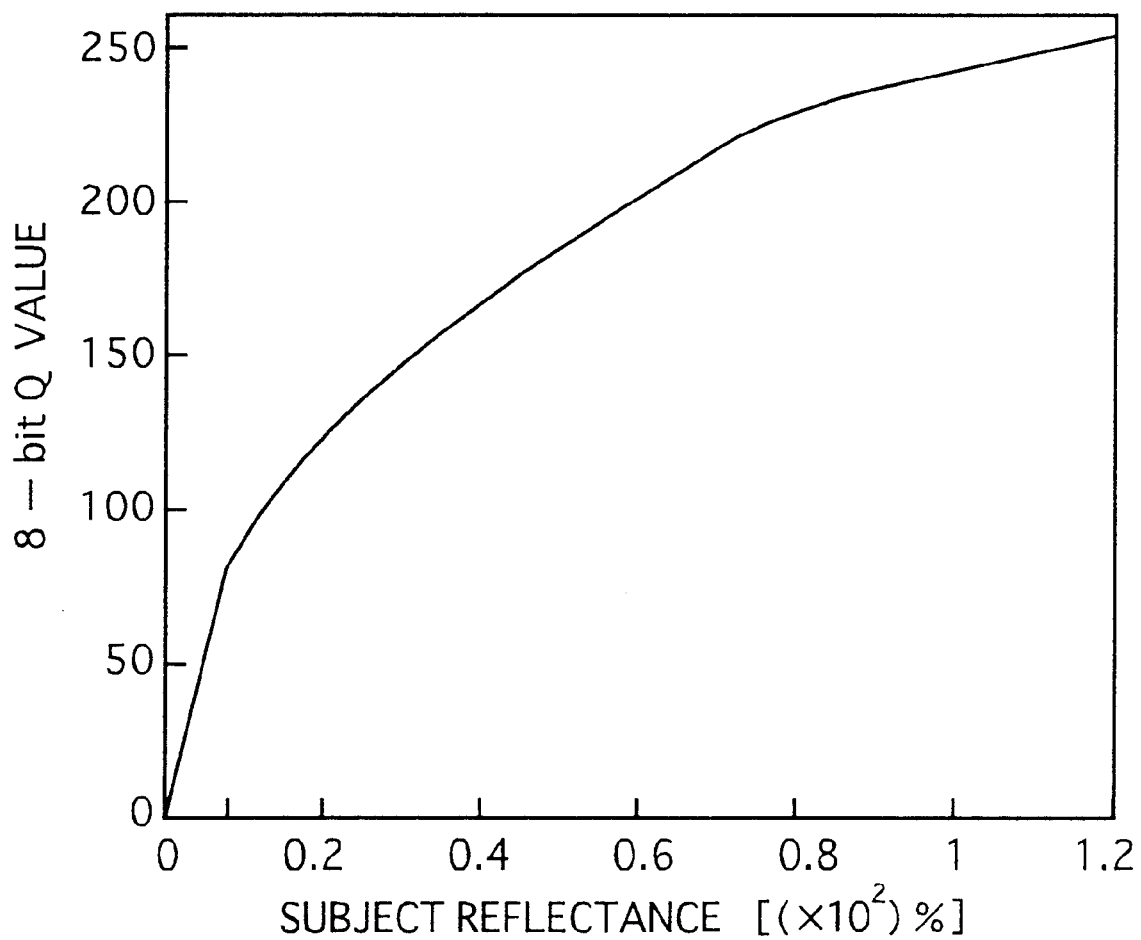
FIG. 15 shows the target gradation curve of the gradation characteristic represented by the formulas for digital luminance output.

(when QL exceeds 255, it is clicked to 255) where, the reflectance of 83.2% is the reflectance of white in a standard gray chart:

FIG. 15 shows the target gradation curve of the gradation characteristics represented by these formulas (HUB spatial gradation curve).

The image signals to be subjected to the frequency processing such as the soft-focus processing, the sharpness enhancement processing and the like may be the image signals themselves which have been directly or indirectly (through a scanner, and the like) captured by various types of cameras such as an ordinary camera, a digital camera, and the like for recording an image on a photographic film. Otherwise, the image signals may be the image signals which have been subjected to the picture-creation processing that is ordinarily carried out in the set-up subsection 58 when the image data captured by the various types of the cameras is finished to a print, that is, they may be the image signals which have been subjected to the gradation processing and the like which are carried out in consideration of the effect of flare when a subject is observed as well as the improvement of color vividness, and so forth, as described in the above example.

In the present invention, the image data, which has been subjected to the picture-creation processing as described above, may be converted into the image signals (exposure amount data) representing the amount corresponding to or proportional to the reproduction luminance and then subjected to the frequency processing. Otherwise, the image data itself, which has been captured by the various types of the cameras may be converted into the image signals (exposure amount data) which represent the amount corresponding to or proportional to the subject luminance or the incident light intensity and then subjected to the frequency processing.

The image processing apparatus according to the present invention and the digital photoprinter using the image processing apparatus are basically arranged as described above. The operations of the image processing apparatus of the present invention and the digital photoprinter will be described below with reference to FIG. 1 to FIG. 5.

The operator loads the scanner 12 with a carrier 28 that is associated with the film F (frame to be read), sets the film F at a prescribed position on the carrier 28, enters the necessary information such as finishing information, the size of the prints to be prepared, and the like, and thereafter keys in a command for starting print preparation.

In response to the START command, the aperture value of the variable diaphragm 24 in the scanner 12 and the storage time of the image sensor (line CCD sensors 32R, 32G and 32B) 32 are set in accordance with the reading conditions for prescan; thereafter, the carrier 28 transports the film F in the auxiliary scanning direction at a prescribed speed to start prescan; the film F is subjected to slit scan and the projected light is focused on the image sensor 32 so that the image recorded on the film F is captured photoelectrically as R, G and B separations at the low resolution.

In the present invention, both prescan and fine scan may be performed frame by frame. Alternatively, all frames may successively be subjected to prescan and fine scan. If desired, prescan and fine scan may continuously be performed on frame groups each consisting of a given number of frames. On the pages that follow, the case of reading the image in one frame is described for the sake of simplicity.

The output signals produced from the image sensor 32 by prescan are amplified by the amplifier 33 and supplied to the A/D converter 34, where they are converted into digital image data, which is input to the image processing apparatus 14 of the present invention.

The digital image data, which has been input to the image processing apparatus 14 of the present invention, is supplied to the LOG converter 38 after the dark current of the image sensor 32, and the like are corrected in the scanner correcting section 36. Then, the digital image data is converted into prescanned image density data using the LUT so that the density range corresponding to prescan, for example, the density range, in which density D is represented by 4, is assigned to 10-bit data. Then, the prescanned image density data is stored in the prescan memory 40.

When the prescanned image density data is stored in the prescan memory 40, the set-up subsection 58 in the condition setting section 48 reads it, creates the density histogram, calculates the image characteristic amounts of the highlight portion, the shadow portion and the like, and sets the reading conditions used in fine scan and supplies them to the scanner 12. Further, the set-up subsection 58 sets the various image processing conditions such as the gradation adjustment, gray balance adjustment and so forth and supplies them to the parameter coordinating subsection 62.

Upon receiving the image processing conditions, the parameter coordinating subsection 62 sets them at a prescribed sites (hardware and software) in prescanned-data processing section 44 and the fine-scanned data processing section 46.

If verification is to be performed, the prescanned data processing section 44 reads the prescanned image density data from the prescan memory 40, and processes it under the image processing conditions set in the image processing subsection 50. Subsequently, the processed data is converted into a suitable form in the image data conversion subsection 52. The converted data is represented as a simulated image on the monitor 20.

Looking at the representation on the monitor 20, the operator checks (verifies) the image, or the result of the processing and, if necessary, manipulates the adjustment keys and the like on the keyboard 18*a* to adjust the color, density, gradation and other features of the image.

The inputs for this adjustment are supplied to the key correcting subsection 60 which, in response to the entered inputs for adjustment, calculates the amounts of correction of the image processing conditions and sends them to the parameter coordinating subsection 62. In response to the supplied amounts of correction, the parameter coordinating subsection 62 corrects the LUTs, MTXs and other conditions in the image processing subsections 50 and 54. The image represented on the monitor 20 also varies in response to this corrective measure, or the inputs for adjustment entered by the operator.

If the operator concludes that the image in the frame of interest represented on the display is appropriate (verification OK), he or she manipulates the keyboard 18*a* or the mouse 18*b* to give a command for print start, whereupon the image processing conditions are finalized and set in the scanner 12 in accordance with the reading conditions for fine scan including the aperture value of the variable diaphragm 24 and, at the same time, the carrier 28 transports the film F at a speed corresponding to the final scan, whereby fine scan gets started.

If no image verification is to be performed, the image processing conditions are finalized at the point of time when the parameter coordinating subsection 62 ends setting of the image processing conditions in the image processing subsection 54 of the fine-scanned data processing section 46, whereby fine scan gets started.

Fine scan is performed in essentially the same manner as prescan except that the reading conditions in it such as the aperture value of the variable diaphragm 24, and the like are different from those in the prescan. The output signals from the image sensor 32 are amplified with the amplifier 33, converted into digital density data by the A/D converter 34 in the image processing apparatus 14, processed by the scanner correcting section 36, and supplied to the LOG converter 38.

In the LOG converter 38, the fine scanned digital image data is processed at a density resolution which is higher than that of the prescanned digital image data. For example, the fine scanned digital image data is converted into fine scanned image density data with the LUT so that the density range, in which density D is represented by 2, is assigned to 10-bit data. Then, the fine scanned image density data is supplied to the fine scan memory 42.

In the image processing subsection 54, the density data, the color data and the gradation data of the fine scanned image data is converted by the color, density and gradation conversion means 64 according to the LUT, and the saturation data of the image signals is converted by the saturation conversion means 66 according to matrix operation. Subsequently, the number of the pixel data of the image density data signals is increased or decreased by the electronic magnification means 68 depending upon the size of the color image to be output to a color paper, and thereafter the image density data signals are directly supplied to the soft-focus processing means 72 bypassing the frequency processing means 70. Whereas, when the image density data signals are input to the frequency processing means 70, they are subjected to the frequency processing such as the edge enhancement and the like, and then supplied to the soft-focus processing means 72.

Upon receiving the fine scanned image density data signals, the soft-focus processing means 72 subjects the image density data signals to soft-focused image creation processing.

That is, when the operator manipulates the keyboard 18*a* to give a command for the creation of the soft-focused image, a command signal is input to the image processing apparatus 14. Then, the parameters which are necessary to the creation of the soft-focused image are set to the soft-focus processing means 72.

When the above parameters are set to the soft-focus processing means 72, first, the image density data having been input is made to original image signals with the tone signal level thereof converted by the tone conversion means 74; the original image signals are converted into antilogarithm original image signals serving as exposure amount data in the antilogarithm conversion means 75 based on, for example, the graph (6) shown in FIG. 11; thereafter, the antilogarithm original image signals are directly supplied to the image signal combining means 88 through the main path. Otherwise, the gain of at least one of the medium and high frequency components of the antilogarithm original image signals is adjusted by the gain adjustment means 76, when necessary, to thereby create gain-adjusted antilogarithm image signals, which are supplied to the image signal combining means 88.

In contrast, the antilogarithm original image signals, which have been output from the antilogarithm conversion means 75, are supplied to the luminance signal conversion means 78 through the bypass and converted into the antilogarithm luminance signal Y; thereafter, the antilogarithm luminance signal Y is supplied to the lowpass filter 80 and antilogarithm unsharp image signals are created thereby; subsequently, the antilogarithm unsharp image signals are supplied to the image signal combining means 88 passing through the density dynamic range compression means 82 without being subjected to any processing in it.

When necessary, the original image signals, which have been output from the tone conversion means 74, are supplied to the image density determination means 84, where the image data of the image in one frame is determined; the adding rate α is adjusted in the adding rate adjustment means 86 in accordance with the density determined by the image density determination means 84; and the original image signals are supplied to the image signal combining means 88.

Finally, the image signal combining means 88 combines the antilogarithm original image signals or the gain-adjusted antilogarithm image signals with the antilogarithm unsharp image signals at a prescribed adding rate α or the adding rate α which has been adjusted in accordance with the image density to thereby obtain antilogarithm soft-focusing image signals; the density data conversion means 90 inversely converts the antilogarithm soft-focusing image signals into soft-focusing image data which is digital density data based on, for example, the graph (6) shown in FIG. 11.

The thus obtained soft-focusing image signals can be reproduced as a color soft-focused image having an effect near to flare which is obtained in actual soft-focusing when multiple exposure is executed by a camera. Further, the soft-focusing image signals can be reproduced as a color soft-focused image which has no unsharpness of the core of the image in a portion such as an edge and the like where it is desired to leave the core of the image as well as no uneven feeling due to graininess in a portion such as a skin, a highlight portion, and the like where it is desired to produce soft feeling.

The soft-focusing image signals, which have been created by the image processing subsection 54 in the fine-scanned data processing section 46 are supplied to the image data conversion subsection 56 and converted into image outputting image data, and thereafter supplied from the image processing apparatus 14 to the image recording apparatus 16.

The image recording apparatus 16 is the combination of a printer (exposing device) that records a latent image on a light-sensitive material (photographic paper) by exposing it in accordance with the input image data and a processor (developing device) that performs prescribed processing steps on the exposed light-sensitive material and which outputs it as a print.

To give one example of the printer's operation, the light-sensitive material is cut to a prescribed length in accordance with the size of the final print; thereafter, the printer records a back print and three light beams for exposure to red (R), green (G) and blue (B) in accordance with the spectral sensitivity characteristics of the light-sensitive material are modulated in accordance with the image data outputted from the image processing apparatus 14; the three modulated light beams are deflected in the main scanning direction while, at the same time, the light-sensitive material is transported in the auxiliary scanning direction perpendicular to the main scanning direction so as to record a latent image by two-dimensional scan exposure with said light beams. The latent image bearing light-sensitive material is then supplied to the processor. Receiving the light-sensitive material, the processor performs a wet development process comprising color development, bleach-fixing and rinsing; the thus processed light-sensitive material is dried to produce a print; a plurality of prints thus produced are sorted and stacked in prescribed units, say, one roll of film.

In the above example, the soft-focus processing means 72 and the sharpness enhancement processing means 71, the frequency processing means 70 including them, and so forth, which are the components characteristic to the present invention, are arranged as hardware. However, the present invention is by no means limited thereto and they may be arranged as software. In this case, the program for executing the frequency processing such as the soft-focus processing, the sharpness enhancement processing, and the like which are the feature of the image processing method of the present invention is stored in an internal memory or in an external memory so that they can be read from the CPU of the processing apparatus 14 as the software. The program is read from the memory prior to the execution of the frequency processing and downloaded into the CPU of the image processing apparatus 14, whereby the frequency processing can be executed.

In the present invention, the frequency processing may be carried out in such a manner that the above software, that is, the program for executing the frequency processing such as the soft-focus processing, the sharpness enhancement processing and the like, which are feature of the image processing method of the present invention is stored in a recording medium 21a shown in FIG. 1; a drive unit 21 is loaded with the recording medium 21a prior to the execution of the frequency processing, and the recording medium 21a is driven thereby; then, the program stored in the recording medium 21a is read and downloaded into the CPU of the image processing apparatus 14. The image processing method, which is the feature of the present invention and recorded on the recording medium 21a as the software may be at least one of the soft-focus processing, the sharpness enhancement processing and the frequency processing which have been mentioned above.

Further, the recording medium 21a on which the software is recorded may be any recording medium so long as it records the program for executing the soft-focus processing, the sharpness enhancement processing, the frequency processing, and the like. For example, a magnetic recording medium such as a magnetic tape, a floppy disc (FD), a hard disc (HD), a ZIP, a MD, an optical magnetic medium such as a MO, and an optical recording medium such as a CD may be exemplified as the recording medium 21a.

While the image processing apparatus, the image processing method and the recording media on which software is recorded of the present invention has been described above in detail, the present invention is by no means limited to the above embodiment and it goes without saying that various improvements and modifications can be made within the range which does not depart from the gist of the invention.

As described above in detail, according to the image processing apparatus and the method of the present invention, there can be created the soft-focused image having feeling of flare and the like, which is near that obtained in soft-focusing executed in the analog mode, that is, there can be created the soft-focused image having an effect near to flare, which is obtained in the actual soft-focus recording of an image when it is recorded with a camera using a soft-focus lens.

In the present invention, when the gain is adjusted or when the adding rate, at which an original image is added to an unsharp image, is adjusted in accordance with an image density in the formation of the soft-focused image through the digital image processing, even if a soft-focusing effect is increased, an edge and a contour are not unsharpened and the core of the image can be left at the edge and the like of the image. Otherwise, even if the soft-focusing effect is decreased to leave the core of the image, the soft-focus processing can be properly applied to the portion such as the skin, the highlight portion and the like where it is desired to produce soft-focused feeling and to the portion such as the edge and the like where it is desired to leave the core of the image without making the graininess of a skin and a highlight portion noticeable.

In the present invention, when the sharpness enhancement processing is carried out after the execution of the antilogarithm (exposure amount) conversion processing, the sharpness of an image can be enhanced while restricting the deterioration of the graininess of particular regions such as the skin of a person, and the like which have the gentle gradation of important colors.

In the present invention, when a graininess restricting sharpness emphasizing method is carried out in combination with the sharpness enhancement processing using antilogarithm (exposure amount) of the present invention, the sharpness of only the edge and the texture of an image can be enhanced while restricting the graininess in the particular portion such as the skin of the person, and the like.

Further, according to the present invention, the above effect can be achieved only by the conversion of the image data which is carried out prior to the frequency processing such as the soft-focus processing, the dodging processing, the sharpness enhancement processing and so forth and only by the inverse conversion of the processed image data, which has been subjected to the frequency processing, without the need of using complicated non-linear type processing and the like midway in the processing operation.

Further, according to the recording medium of the present invention, the image processing apparatus of the present invention for executing the image processing method of the present invention, which achieves the above effects, can be arranged by simply setting the image processing method, which carries out the frequency processing such as the soft-focus processing, the dodging processing, the sharpness enhancement processing, and the like for achieving the above effects, to the image processing apparatus as the software.

What is claimed is:

1. An image processing apparatus for creating digital soft-focusing image signals, which create an soft-focused image, by subjecting digital original image signals to image processing, comprising:

means for converting the original image signals into conversion image signals which represent an amount corresponding to luminance of a subject, intensity of incident light, or reproducing luminance;

means for creating soft-focus processing conversion image signals by subjecting the conversion image signals to preset smoothing processing; and means for inversely converting the soft-focus processing conversion image signals into the digital soft-focusing image signals.

2. An image processing apparatus according to claim 1, wherein said means for creating the soft-focus processing conversion image signals comprises:

means for creating unsharp image signals from the conversion image signals; and addition mean for adding the conversion image signals to the unsharp image signals at a preset adding rate to thereby create the soft-focus processing conversion image signals.

3. An image processing apparatus according to claim 2, wherein said means for creating the soft-focus processing conversion image signals further comprises gain adjustment means for adjusting at least one of the gains of the medium frequency component and the high frequency component of the conversion image signals, and wherein said adding means adds the conversion image signals, whose gain has been adjusted by said gain adjustment means, to the unsharp image signals to thereby create the soft-focus processing conversion image signals.

4. An image processing apparatus according to claim 3, wherein said means for creating the soft-focus processing conversion image signals further comprises adding rate adjustment means for adjusting the preset adding rate at which the gain-adjusted conversion image signals are added to the unsharp image signals.

5. An image processing apparatus according to claim 2, wherein said means for creating the soft-focus processing conversion image signals further comprises adding rate adjustment means for adjusting the preset adding rate at which the conversion image signals are added to the unsharp image signals.

6. An image processing apparatus according to claim 5, wherein said means for creating the soft-focus processing conversion image signals further comprises determination means for determining a density in an image using the original image signals, and wherein said adding rate adjustment means adjusts the preset adding rate in accordance with the density in the image determined by said determination means.

7. An image processing apparatus according to claim 2, wherein said means for creating the unsharp image signals is unsharp mask processing means including a lowpass filter.

8. An image processing apparatus according to claim 2, wherein said means for creating the unsharp image signals comprises means for converting the conversion image signals into a luminance signal and unsharp mask processing means for subjecting luminance image signals which have been converted into the luminance signal to unsharp mask processing.

9. An image processing apparatus according to claim 1, wherein the original image signals and the digital soft-focusing image signals are image signals which represent an amount corresponding to an optical density a logarithmic exposure amount.

10. An image processing apparatus for creating digital frequency processing image signals, which create a frequency-processed image, by subjecting digital original image signals to frequency processing, comprising:

means for converting the original image signals into conversion image signals which represent an amount corresponding to luminance of a subject, intensity of incident light, or reproducing luminance;

frequency processing means for carrying out frequency processing using the conversion image signals; and means for inversely converting the conversion image signals which have been subjected to the frequency processing into the digital frequency processing image signals.

11. An image processing apparatus according to claim 10, wherein said frequency processing is soft-focus processing or sharpness enhancement processing, and said frequency processing means is soft-focus processing means or sharpness enhancement processing means.

12. An image processing method, comprising the steps of:

converting digital original image signals into conversion image signals which represent an amount corresponding to subject luminance, incident light intensity, or reproducing luminance;

creating soft-focus processing conversion image signals by subjecting the resultant conversion image signals to preset smoothing processing; and inversely converting the resultant soft-focus processing conversion image signals into digital soft-focusing image signals.

13. An image processing method according to claim 12, wherein the soft-focus processing conversion image signals are created by creating unsharp image signals from the conversion image signals and adding the conversion image signals to the unsharp image signals at preset adding rate.

14. An image processing method according to claim 13, wherein the soft-focus processing conversion image signals are created by adjusting at least one of the gains of the medium frequency component and the high frequency component of the conversion image signals and adding the gain-adjusted conversion image signals to the unsharp image signals.

15. An image processing method according to claim 14, wherein the preset adding rate, at which the gain-adjusted conversion image signals are added to the unsharp image signals, is adjusted.

16. An image processing method according to claim 13, wherein the preset adding rate, at which the conversion image signals are added to the unsharp image signals, is adjusted.

17. An image processing method according to claim 16, wherein the density in an image is determined using the original image signals, and the preset adding rate is adjusted in accordance with the determined density in the image.

18. An image processing method according to claim 13, wherein the unsharp image signals are created by unsharp mask processing executed using a lowpass filter.

19. An image processing method according to claim 13, wherein the unsharp image signals are created by converting the conversion image signals into a luminance signal and subjecting luminance image signals, which have been converted into the luminance signal, to unsharp mask processing.

20. An image processing method according to claim 12, wherein the original image signals and the digital soft-focusing image signals are image signals which represent an amount corresponding to an optical density or a logarithmic exposure amount.

21. An image processing method, comprising the steps of:
converting digital original image signals into conversion image signals which represent an amount corresponding to subject luminance, incident light intensity, or reproducing luminance;
carrying out frequency processing using the resultant conversion image signals; and
inversely converting the resultant frequency-processed conversion image signals into digital frequency-processed image signals.

22. An image processing method according to claim 21, wherein the frequency processing is soft-focus processing or sharpness enhancement processing.

23. A recording medium on which software for executing the image processing method according to claim 12 is recorded.

24. A recording medium on which software for executing the image processing method according to claim 21 is recorded.

* * * * *